US011775602B2

(12) United States Patent
Doraiswamy et al.

(10) Patent No.: US 11,775,602 B2
(45) Date of Patent: Oct. 3, 2023

(54) SPATIAL QUERIES

(71) Applicant: New York University, New York, NY (US)

(72) Inventors: Harish Doraiswamy, New York, NY (US); Juliana Freire, New York, NY (US)

(73) Assignee: New York University, New York, NY (US)

( * ) Notice: Subject to any disclaimer, the term of this patent is extended or adjusted under 35 U.S.C. 154(b) by 708 days.

(21) Appl. No.: 16/861,163

(22) Filed: Apr. 28, 2020

(65) Prior Publication Data

US 2020/0342042 A1   Oct. 29, 2020

Related U.S. Application Data

(60) Provisional application No. 62/840,377, filed on Apr. 29, 2019.

(51) Int. Cl.
*G06F 16/9537* (2019.01)
*G06F 16/29* (2019.01)
*G06T 1/20* (2006.01)
*G06F 16/9538* (2019.01)
*G06F 16/26* (2019.01)

(52) U.S. Cl.
CPC ......... *G06F 16/9537* (2019.01); *G06F 16/26* (2019.01); *G06F 16/29* (2019.01); *G06F 16/9538* (2019.01); *G06T 1/20* (2013.01)

(58) Field of Classification Search
None
See application file for complete search history.

(56) References Cited

U.S. PATENT DOCUMENTS

2018/0032597 A1 *   2/2018   Duan ................. G06F 16/2282

FOREIGN PATENT DOCUMENTS

WO    WO-2005013200 A1 *   2/2005 ....... G06F 17/30241

OTHER PUBLICATIONS

Zacharatou et al, "GPU Rasterization for Real-Time Spatial Aggregation over Arbitrary Polygons," *Proceedings of the VLDB Endowment*, vol. 11, No. 3, pp. 352-365 (Nov. 2017).

* cited by examiner

*Primary Examiner* — Amresh Singh
(74) *Attorney, Agent, or Firm* — John C. Pokotylo; Pokotylo Patent Services

(57) ABSTRACT

Advances in technology and the availability of low cost sensors have led to an unprecedented growth in the volume of spatial data. Unfortunately, the time required to evaluate even simple spatial queries over large data sets greatly hampers the ability to interactively explore these data sets and extract actionable insights. While modern hardware (such as Graphics Processing Units or GPUs) are increasingly being used to speed up spatial queries, existing solutions have two important drawbacks: they are often tightly coupled to the specific query types they target, making it hard to adapt them for other queries; and since their design is based on CPU-based approaches, it can be difficult to effectively utilize all the benefits provided by the said hardware. To overcome these issues, spatial data are represented as geometric objects and a set of composable operators that operate over these objects are defined. The expressiveness of the proposed representation is demonstrated by realizing standard spatial queries as a composition of the proposed operators. To illustrate the performance gains that can be attained, a proof-of-concept GPU-based implementation focusing on a subset of the operators was built and evaluated.

17 Claims, 13 Drawing Sheets

Example Query

Input Points

Query Polygon

Geometric Interpretation

Step I: Compute Merge     Step II: Select Intersection

SELECT * FROM Restaurants WHERE Location INSIDE Q

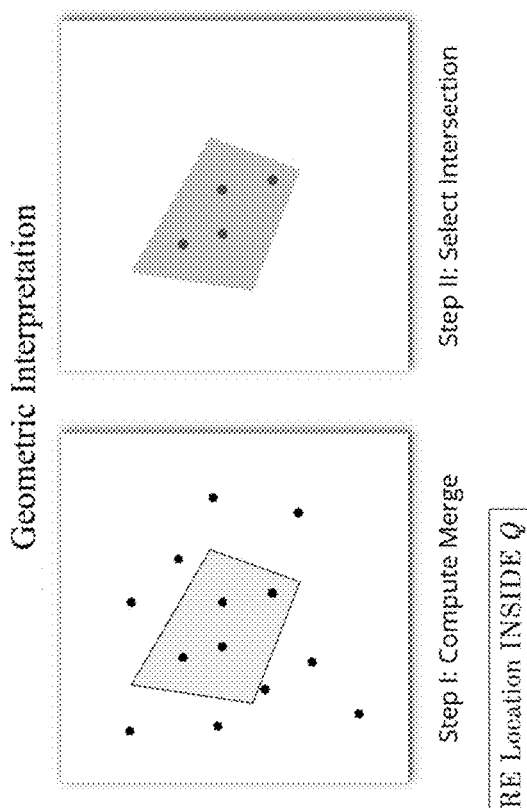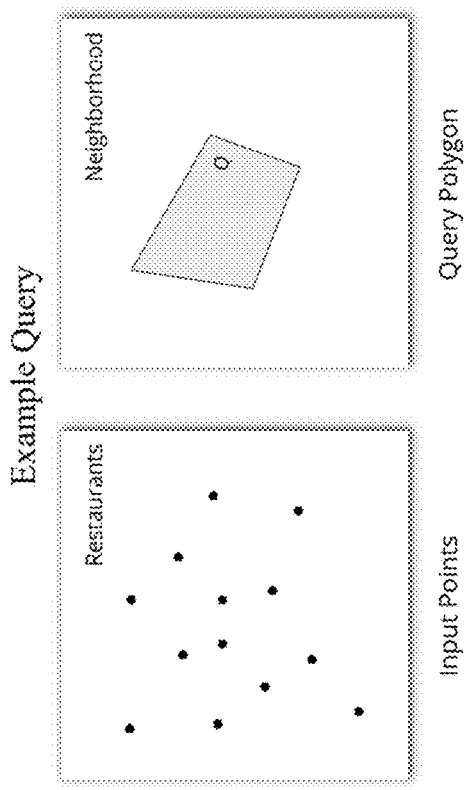
FIGURE 1(a) Example Query
FIGURE 1(b) Geometric Interpretation

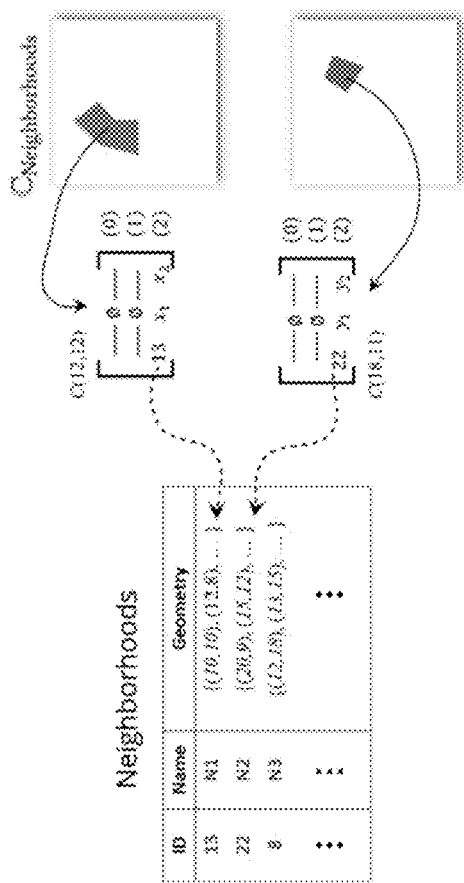
FIGURE 2(c)
FIGURE 2(d)
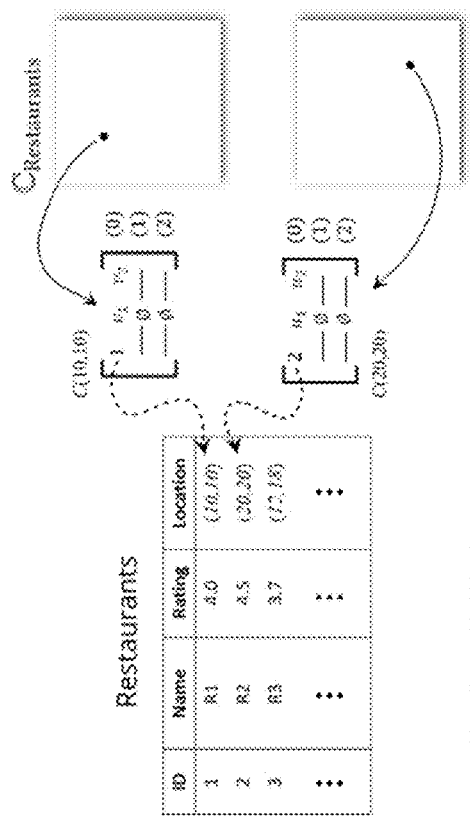
FIGURE 2(a)
FIGURE 2(b)

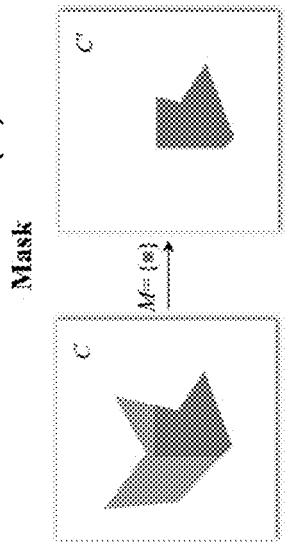
FIGURE 4(c) Mask
$C' = \mathscr{M}[M](C)$
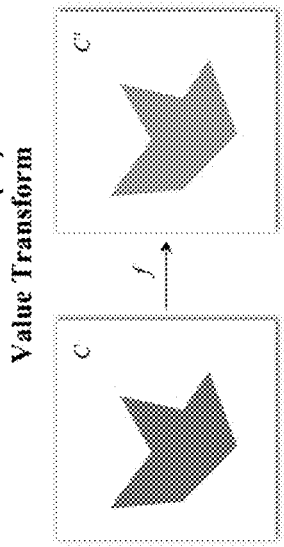
FIGURE 4(b) Value Transform
$C' = \mathscr{V}[f](C)$
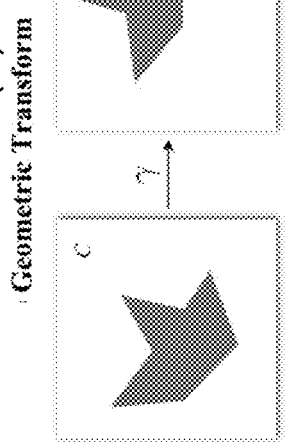
FIGURE 4(a) Geometric Transform
$C' = \mathscr{G}[\gamma](C)$
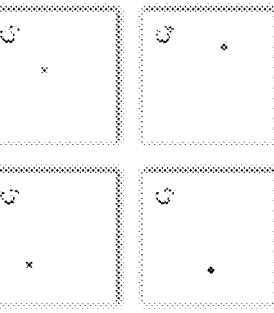
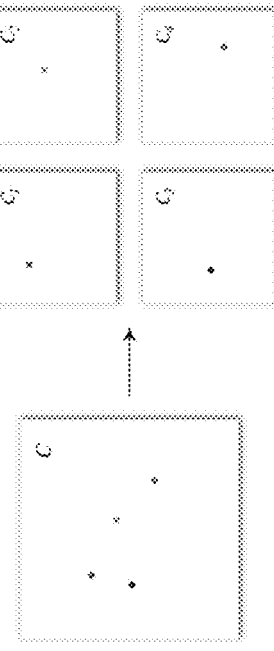
FIGURE 4(e) Dissect
$\{C_1, C_2, C_3, C_4\} = \mathscr{D}(C)$
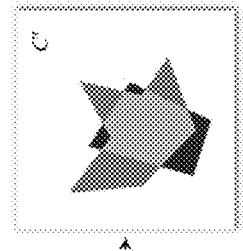
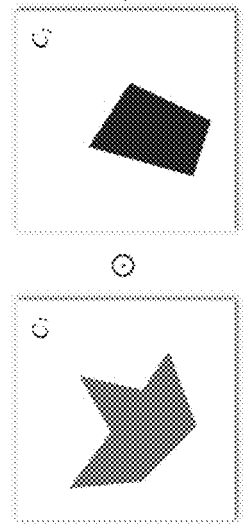
FIGURE 4(d) Blend
$C' = \mathscr{B}[\odot](C_1, C_2)$

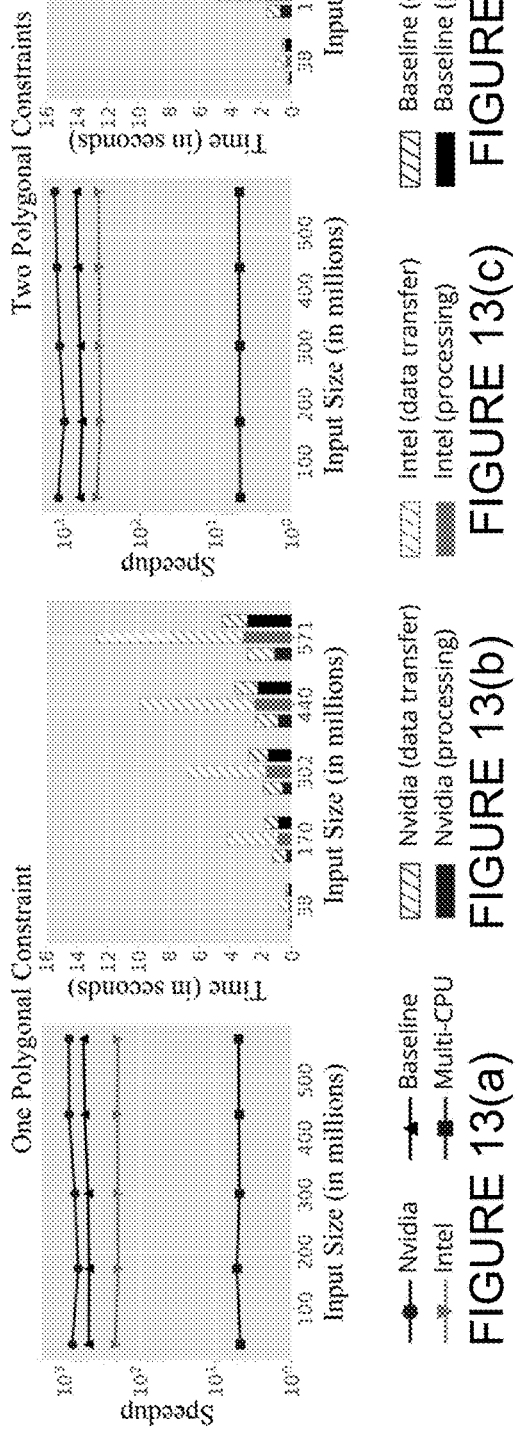
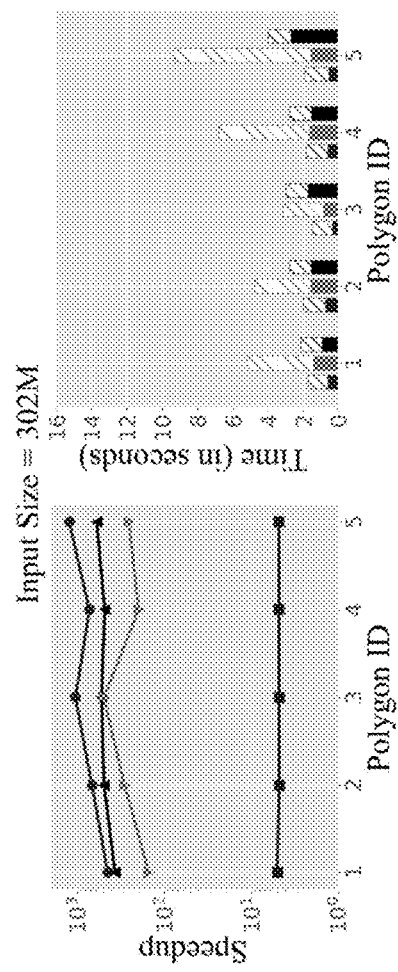
FIGURE 13(a)
FIGURE 13(b)
FIGURE 13(c)
FIGURE 13(d)
FIGURE 14

SPATIAL QUERIES

§ 0. RELATED APPLICATION(S)

This application claims the benefit of U.S. Provisional Patent Application Ser. No. 62/840,377 (referred to as "the '377 provisional" and incorporated herein by reference), filed on Apr. 29, 2019, titled "IMPROVING SPATIAL QUERIES" and listing Harish DORAISWAMY and Juliana FREIRE as the inventors. Each of the references cited in the '377 provisional is incorporated herein by reference. The present invention is not limited to requirements of the particular embodiments described in the '377 provisional.

§ 1. BACKGROUND OF THE INVENTION

§ 1.1 Field of the Invention

Example embodiments consistent with the present description concern spatial data and querying spatial data.

§ 1.2 Background Information

Advances in technology and the availability of low cost sensors such as GPS in vehicles and mobile devices has led to an unprecedented growth in the volume of spatial data. These include data captured by social media applications (e.g., Twitter, Instagram, etc.), public transportation (e.g., subway, bus, taxi trips, etc.) and other urban data (e.g., crime, 311 non-emergency complaints, etc.), to name a few. The availability of these data has opened up new vistas to derive valuable insights that not only can be monetized (See, e.g., the document: J. Valentino-DeVries, N. Singer, M. H. Keller, and A. Krolik, "Your Apps Know Where You Were Last Night, and They're Not Keeping It Secret," www.nytimes.com/interactive/2018/12/10/business/locationdata-privacy-apps.html (December 2018) (Incorporated herein by reference).), but that can also be used for social good by informing public policy (See, e.g., the documents: "The Secret of Success," www.economist.com/news/united-states/21633878-americas-great-crime-wave-receding-some-cities-faster-others-secret, November 2014 Applied Mathematics. (Incorporated herein by reference); I. G. Ellen, J. Lacoe, and C. A. Sharygin, "Do Foreclosures Cause Crime?," *Journal of Urban Economics*, 74: 59-70 (2013) (Incorporated herein by reference); K. M. Horn, I. G. Ellen, and A. E. Schwartz, "Do Housing Choice Voucher Holders Live Near Good Schools?," *Journal of Housing Economics*, 24 (0): 109-121 (2014) (Incorporated herein by reference); and B. S. Noveck, "Rights-Based and Tech-Driven: Open Data, Freedom of Information, and the Future of Government Transparency," *Yale Human Rights and Development Law Journal*, 19 (1) (2017) (Incorporated herein by reference).), and advancing science in several domains (See, e.g., the documents: A. Aji, F. Wang, and J. H. Saltz, "Towards Building a High Performance Spatial Query System for Large Scale Medical Imaging Data," *Proceedings of the 20th International Conference on Advances in Geographic Information Systems*, SIGSPATIAL '12, pages 309-318 (ACM, 2012) (Incorporated herein by reference); and V. S. Kumar, T. Kurc, J. Saltz, G. Abdulla, S. R. Kohn, and C. Matarazzo, "Architectural Implications for Spatial Object Association Algorithms," 2009 *IEEE International Symposium on Parallel Distributed Processing*, pages 1-12 (May 2009) (Incorporated herein by reference).). Extracting these insights, however, requires the ability to effectively and efficiently handle a variety of queries over these data sets.

A key characteristic that differentiates spatial data from the more common relational data is the presence of a geometric component as part of each tuple in the data. The most common approach to support spatial queries is through the use of spatial extensions that are available for existing relational database systems. (See, e.g., the Post-GIS extension for PostgreSQL (See, e.g., the document: PostGIS: Spatial and geographic objects for PostgresQL. postgis.net (2018) (Incorporated herein by reference).), Oracle Spatial (See, e.g., the document: Oracle Spatial and Graph. www.oracle.com/technetwork/databaseoptions/spatialandgraph/docum entation/spatial-doc-idx-161760.html (2018) (Incorporated herein by reference).), DB2 Spatial Extender (See, e.g., the document: D. W. Adler, "Db2 spatial extender—spatial data within the rdbms," *Proceedings of the 27th International Conference on Very Large Data Bases, VLDB '01*, pages 687-690, San Francisco, Calif., USA (2001, Morgan Kaufmann Publishers Inc.) (Incorporated herein by reference).), and SQL Server Spatial (See, e.g., the document: SQL Server Spatial. docs.microsoft.com/enus/sql/relational-databases/spatial/spatial-data-sqlserver? view=sql-server-2017 (2018) (Incorporated herein by reference).) These are widely-used relational systems that have been retrofitted to support a variety of spatial queries as well. There are also application-specific solutions that target specific queries or query classes and use custom data structures and algorithms (See, e.g., the documents: V. Garcia, E. Debreuve, F. Nielsen, and M. Barlaud, "K-Nearest Neighbor Search: Fast GPU-Based Implementations and Application to High-Dimensional Feature Matching," *Proc. ICIP*, pages 3757-3760 (IEEE, September 2010) (Incorporated herein by reference); H. Doraiswamy, H. T. Vo, C. T. Silva, and J. Freire, "A GPU-Based Index to Support Interactive Spatio-Temporal Queries Over Historical Data," *Proc. ICDE*, pages 1086-1097 (IEEE, May 2016) (Incorporated herein by reference); and E. Tzirita Zacharatou, H. Doraiswamy, A. Ailamaki, C. T. Silva, and J. Freire, "GPU Rasterization for Real-Time Spatial Aggregation Over Arbitrary Polygons," *PVLDB*, 11 (3): 352-365 (2017) (Incorporated herein by reference).). Popular geographic information system (GIS) software typically connect to the above database systems. (See, e.g., the documents: ArcGIS. www.arcgis.com (2018) (Incorporated herein by reference); GRASS GIS. grass.osgeo.org (2018) (Incorporated herein by reference); and QGIS. www.qgis.org/en/site/(2018) (Incorporated herein by reference).) While some of them also provide their own database solution, their support is restricted to specific queries that support the required functionality.

The main shortcoming of these systems is that each class of spatial queries typically has its own implementation. This makes the approaches in these systems rigid and hard to extend; it is difficult to reuse these implementations for other similar queries. To support additional queries, new implementations are often required. As an example, consider the simple spatial selection query illustrated in FIG. 1(a). Given a spatial data set consisting of a collection of points (e.g., restaurants) and their locations, this query identifies all points that are contained within the specified query polygon (e.g., a neighborhood). Existing databases implement this query as a single operator typically making use of a spatial index, which organizes the minimum bounding rectangle (MBR) of the spatial objects in a tree structure. The index is used to identify relevant MBRs. Then, for each point inside the selected MBRs, a test is performed to check whether the point is inside the query polygon. Note that this containment test (point in polygon) is specific to the input being points. If the spatial component of the restaurant data is instead represented as a polygon (e.g., the land plot where the restaurant is located), then the selection query requires a different implementation since a different test (polygon intersection with polygon) must be performed for this query.

The inherently heterogeneous representations used for the spatial component of the data is also a cause of such rigidity. Different geometric types (e.g., points, triangles, rectangles, polygons etc.), even conceptually, have different representations. Thus, a technique that works for one geometric type (e.g., points) is not applicable for another type (e.g., polygons), and even small extensions to a query often has to be implemented from scratch (as in the above example, where the input is changed from points to polygons).

This trait also restricts the ways in which complex queries can be composed using the different operators, because these operators themselves correspond to (often complex) queries, each having their own specific implementations. Therefore, the query optimizer has limited options when deciding the order of spatial operations for a complex query, often resulting in the generation of costly query plans. For example, consider a spatial aggregation query, which counts the number of restaurants for all neighborhood polygons of a city. Using the current representation, the plan returned by existing query optimizers is to perform a spatial join followed by aggregating the join results. Consequently, the execution is sub-optimal and negatively impacts the response time. (See, e.g., the document, E. Tzirita Zacharatou, H. Doraiswamy, A. Ailamaki, C. T. Silva, and J. Freire, "GPU Rasterization for Real-Time Spatial Aggregation Over Arbitrary Polygons," *PVLDB*, 11(3):352-365 (2017) (Incorporated herein by reference).) To address this problem, the present inventors proposed RasterJoin (See, e.g., the document: E. Tzirita Zacharatou, H. Doraiswamy, A. Ailamaki, C. T. Silva, and J. Freire, "GPU Rasterization for Real-Time Spatial Aggregation Over Arbitrary Polygons," *PVLDB*, 11(3): 352-365 (2017) (Incorporated herein by reference).) to speed up such spatial aggregation queries through the use of native rasterization-based graphics pipeline. RasterJoin computes partial spatial aggregates of the points which are then joined with the polygons to compute the final aggregation. By employing a strategy with a different set of operations and ordering, it attains at least two orders of magnitude speedup. However, like previous approaches, RasterJoin works only for one class of queries: namely, spatial aggregations involving point-based and polygon-based data sets.

Current approaches also make it difficult for new advances (e.g., using modern hardware such as graphics processing units or GPUs) proposed for one type of query to be carried over to other similar queries. For example, techniques have been proposed that use GPUs to efficiently evaluate different types of queries, including spatial selection (See, e.g., the document: H. Doraiswamy, H. T. Vo, C. T. Silva, and J. Freire, "A GPU-Based Index to Support Interactive Spatio-Temporal Queries Over Historical Data," *Proc. ICDE*, pages 1086-1097 (IEEE, May 2016) (Incorporated herein by reference).), spatial join (See, e.g., the document: J. Zhang, S. You, and L. Gruenwald, "Efficient Parallel Zonal Statistics on Large-Scale Global Biodiversity Data on GPUs," *Proc. BigSpatial*, pages 35-44, New York, N.Y., USA (2015, ACM) (Incorporated herein by reference).), spatial aggregation (See, e.g., the document: E. Tzirita Zacharatou, H. Doraiswamy, A. Ailamaki, C. T. Silva, and J. Freire, "GPU Rasterization for Real-Time Spatial Aggregation Over Arbitrary Polygons," *PVLDB*, 11(3):352-365 (2017) (Incorporated herein by reference).), and nearest-neighbor queries (See, e.g., the document: B. Bustos, O. Deussen, S. Hiller, and D. Keim, "A Graphics Hardware Accelerated Algorithm for Nearest Neighbor Search," In V. N. Alexandrov, G. D. van Albada, P. M. A. Sloot, and J. Dongarra, editors, *Proc. ICCS*, pages 196-199, Berlin, Heidelberg (2006. Springer Berlin Heidelberg) (Incorporated herein by reference).). While concepts introduced in these approaches (e.g., GPU-friendly indexes, computing spatial intersections) can be useful for other queries, because the different query evaluation strategies are atomic, it is not possible to reuse them. Therefore, new strategies must be implemented that use these concepts for other query types.

§ 1.2.1 Spatial Queries

The most common approach used for executing spatial queries is to implement custom techniques for the different types of queries. Selection queries, for example, are typically handled through the use of spatial indexes. These include R-Trees (See, e.g., the document: A. Guttman, "R-Trees: A Dynamic Index Structure for Spatial Searching," *SIGMOD Rec.*, 14(2):47-57 (June 1984) (Incorporated herein by reference).), R*-trees (See, e.g., the document: N. Beckmann, H. Kriegel, R. Schneider, and B. Seeger, "The R*-tree: an Efficient and Robust Access Method for Points and Rectangles," *SIGMOD Rec.*, 19(2):322-331 (May 1990) (Incorporated herein by reference).), kd-trees (See, e.g., the document: J. L. Bentley, "Multidimensional Binary Search Trees Used for Associative Searching," *Commun. ACM*, 18(9):509-517 (1975) (Incorporated herein by reference).), quad trees (See, e.g., the document: R. Finkel and J. Bentley, "Quad Trees a Data Structure for Retrieval on Composite Keys," *Acta Informatica*, 4(1):1-9 (1974) (Incorporated herein by reference).) and the grid index (See, e.g., the document: P. Rigaux, M. Scholl, and A. Voisard, *Spatial Databases with Application to GIS*, Morgan Kaufmann Publishers Inc., San Francisco, Calif., USA (2002) (Incorporated herein by reference).). While such indexes form the core of other query types as well, such as spatial joins, additional enhancements are added to design more efficient algorithms specific to each of these queries. For example, several works focus on the filtering step of spatial join algorithms (See, e.g., the documents: E. H. Jacox and H. Samet, "Spatial Join Techniques," *ACM Trans. Database Syst.*, 32(1) (March 2007) (Incorporated herein by reference); T. Brinkhoff, H. Kriegel, and B. Seeger, "Efficient Processing of Spatial Joins Using R-Trees," *SIGMOD Rec.*, 22(2):237-246 (June 1993). (Incorporated herein by reference); Patel and D. DeWitt, "Partition Based Spatial-Merge Join," *SIGMOD Rec.*, 25(2):259-270 (June 1996) (Incorporated herein by reference); and M. Pavlovic, T. Heinis, F. Tauheed, P. Karras, and A. Ailamaki, "Transformers: Robust Spatial Joins on Non-Uniform Data Distributions," *Proc. ICDE*, pages 673-684 (IEEE, May 2016) (Incorporated herein by reference).). Spatial aggregation queries also have their own set of custom algorithms. (See, e.g., the documents: I. F. V. Lopez, R. T. Snodgrass, and B. Moon, "Spatiotemporal Aggregate Computation: A Survey," *IEEE TKDE*, 17(2):271-286 (February 2005) (Incorporated herein by reference); Y. Tao, D. Papadias, and J. Zhang, "Aggregate Processing of Planar Points," *Proc. EDBT*, pages 682-700, Berlin, Heidelberg (2002, Springer Berlin Heidelberg) (Incorporated herein by reference); and L. Wang, R. Christensen, F. Li, and K. Yi, "Spatial Online Sampling and Aggregation," *PVLDB*, 9(3):84-95 (2015) (Incorporated herein by reference).) For instance, one such approach enhances the R-tree structure to generate an R-tree (See, e.g., the documents: D. Papadias, P. Kalnis, J. Zhang, and Y. Tao, "Efficient Olap Operations in Spatial Data Warehouses," *Proc. SSTD*, pages 443-459, London, UK (UK, 2001, Springer-Verlag) (Incorporated herein by reference).), that stores aggregate information in intermediate nodes of the R-tree. Nearest neighbor-based queries also have their own set of optimized algorithms. (See e.g., the documents: H. V. Jagadish, B. C. Ooi, K. Tan, C. Yu, and R. Zhang, "idistance: An Adaptive b+-Tree Based Indexing Method for Nearest Neighbor Search," *ACM Trans. Database Syst.*, 30(2):364-397 (June 2005) (Incorporated herein by reference); P. N. Yianilos, "Data Structures and Algorithms for Nearest Neighbor Search in General Metric Spaces," *Proc. SODA*, pages 311-321, Philadelphia, Pa., USA (1993, Society for Industrial and Applied Mathematics) (Incorporated herein by reference); N. Katayama and S. Satoh, "The SR-Tree: An Index Structure for High-Dimensional Nearest Neighbor Queries," *SIGMOD Rec.*, 26(2):369-380 (June 1997) (Incorporated herein by reference); G. R. Hjaltason and H. Samet, "Distance Browsing in Spatial Databases," *ACM Trans. Database Syst.*, 24(2):265-318 (June 1999) (Incorporated herein by reference); and N. Roussopoulos, S. Kelley, and F. Vincent, "Nearest Neighbor Queries," SIGMOD Rec., 24(2):71-79 (May 1995) (Incorporated herein by reference).)

The advent of affordable modern hardware with multiple processing units has led to the design of new approaches that use them for spatial query processing. In particular, graphics processing units (GPUs) and clusters supporting the MapReduce paradigm are extremely popular for this purpose. For example, GPUs have been used for spatial selections (See, e.g., the document: H. Doraiswamy, H. T. Vo, C. T. Silva, and J. Freire, "A GPU-Based Index to Support Interactive Spatio-Temporal Queries Over Historical Data," *Proc. ICDE*, pages 1086-1097 (IEEE, May 2016) (Incorporated herein by reference).), spatial joins (See, e.g., the documents: J. Zhang, S. You, and L. Gruenwald, "Efficient Parallel Zonal Statistics on Large-Scale Global Biodiversity Data on GPUs," *Proc. BigSpatial*, pages 35-44, New York, N.Y., USA (2015, ACM) (Incorporated herein by reference); and D. Aghajarian, S. Puri, and S. Prasad, "GCMF: An Efficient End-To-End Spatial Join System Over Large Polygonal Datasets on GPGPU Platform," *In Proc. GIS*, pages 18:1-18:10, New York, N.Y., USA (2016, ACM) (Incorporated herein by reference).), spatial aggregations (See, e.g., the document, E. Tzirita Zacharatou, H. Doraiswamy, A. Ailamaki, C. T. Silva, and J. Freire, "GPU Rasterization for Real-Time Spatial Aggregation Over Arbitrary Polygons," *PVLDB*, 11(3):352-365 (2017) (Incorporated herein by reference).), as well as nearest neighbor queries (See, e.g., the documents: B. Bustos, O. Deussen, S. Hiller, and D. Keim, "A Graphics Hardware Accelerated Algorithm for Nearest Neighbor Search," In V. N. Alexandrov, G. D. van Albada, P. M. A. Sloot, and J. Dongarra, editors, *Proc. ICCS*, pages 196-199, Berlin, Heidelberg (2006, Springer Berlin, Heidelberg) (Incorporated herein by reference); and J. Pan and D. Manocha, "Fast GPU-Based Locality Sensitive Hashing for K-Nearest Neighbor Computation," *Proc. GIS*, pages 211-220, New York, N.Y., USA (2011, ACM) (Incorporated herein by reference).). Similarly, there are dedicated spatial database systems designed using MapReduce such as Hadoop-GIS (See, e.g., the document: A. Aji, F. Wang, H. Vo, R. Lee, Q. Liu, X. Zhang, and J. Saltz, "Hadoop GIS: A High Performance Spatial Data Warehousing System over Mapreduce," *PVLDB*, 6(11): 1009-1020 (August 2013) (Incorporated herein by reference).) and Simba (See, e.g., the document: D. Xie, F. Li, B. Yao, G. Li, L. Zhou, and M. Guo, "Simba: Efficient In-Memory Spatial Analytics," *Proc. SIGMOD*, pages 1071-1085, New York, N.Y., USA (2016, ACM) (Incorporated herein by reference).). Eldawy and Mokbel (See, e.g., the document: A. Eldawy and M. F. Mokbel, "The Era of Big Spatial Data: A Survey," *Found. Trends databases*, 6(3-4): 163-273 (December 2016) (Incorporated herein by reference).) provide a comprehensive survey of approaches that use MapReduce for spatial query processing.

Many of these approaches (e.g., indexes) can be easily applied to supplement the different operators described in this application.

§ 1.2.2 Spatial Data Models (Representations) and Operations (Algebras).

Given the tremendous success of the relational model and associated algebra (i.e., operations), similar approaches have been used for different types of data. For instance, there have been several models designed for data cube/multidimensional OLAP (See, e.g., the documents: C. Li and X. S. Wang, "A Data Model for Supporting On-Line Analytical Processing," *Proc. CIKM*, pages 81-88, New York, N.Y., USA (1996, ACM) (Incorporated herein by reference).); M. Gyssens and L. V. S. Lakshmanan, "A Foundation for Multi-Dimensional Databases," *Proc. VLDB*, pages 106-115, San Francisco, Calif., USA (1997, Morgan Kaufmann Publishers Inc.) (Incorporated herein by reference); and H. Thomas and A. Datta, "A Conceptual Model and Algebra for On-Line Analytical Processing in Decision Support Databases," *ISR*, 12(1):83-102 (2001) (Incorporated herein by reference).). Baumann (See, e.g., the document: P. Baumann, "A Database Array Algebra for Spatio-Temporal Data and Beyond," *Proc. NGITS*, pages 76-93, Berlin, Heidelberg (1999, Springer-Verlag) (Incorporated herein by reference).) introduced a database array algebra to represent and manipulate multi-dimensional arrays targeting applications in statistics, OLAP, and also image manipulation. Jagadish et al. (See, e.g., the document: H. V. Jagadish, L. V. S. Lakshmanan, D. Srivastava, and K. Thompson, "Tax: A Tree Algebra for XML," *Proc. DBPL*, pages 149-164, Berlin, Heidelberg (2002, Springer-Verlag) (Incorporated herein by reference).) proposed the Tree Algebra for XML data, Cluet et al. (See, e.g., the document: S. Cluet, C. Delobel, C. L'ecluse, and P. Richard, "Reloop, an Algebra Based Query Language for an Object-Oriented Database System," *Data Knowl. Eng.*, 5(4):333-352 (October 1990) (Incorporated herein by reference).) proposed a data model for object-oriented databases, while more recently Moffitt and Stoyanovich (See, e.g., the document: V. Z. Moffitt and J. Stoyanovich, "Temporal Graph Algebra," *Proc. DBPL*, pages 10:1-10:12 (ACM, 2017) (Incorporated herein by reference).) proposed an algebra for temporally evolving graphs.

Specific to spatial databases, Gating (See, e.g., the document: R. H. Gating, "Geo-Relational Algebra: A Model and Query Language for Geometric Database Systems," *Proc. EDBT*, pages 506-527, London, UK (UK, 1988, Springer-Verlag) (Incorporated herein by reference).) introduced geo-relational algebra, which extends relational algebra to include geometric data types and operators. The geometric data types included points, lines, and polygons (without holes), and the geometric operators included operations that are now common in most spatial database solutions (such as containment, intersection, perimeter, area, etc.). Aref and Samet (See, e.g., the documents: H. Samet and W. G. Aref, "Spatial Data Models and Query Processing," in W. Kim, editor, *Modern Database Systems*, pages 338-360 (ACM Press/Addison-Wesley Publishing Co., New York, N.Y., USA, 1995) (Incorporated herein by reference); W. G. Aref and H. Samet, "Extending a DBMS with Spatial Operations," *Proceedings of the Second International Symposium* on *Advances in Spatial Databases, SSD '91*, pages 299-318, London, UK (UK, 1991, Springer-Verlag) (Incorporated herein by reference); and W. G. Aref and H. Samet, "Optimization for Spatial Query Processing," *Proceedings of the 17th International Conference on Very Large Data Bases, VLDB '91*, pages 81-90, San Francisco, Calif., USA (1991, Morgan Kaufmann Publishers Inc.) (Incorporated herein by reference).) generalized the above model and provided one of the first high-level discussions on integrating spatial and non-spatial data to build a spatial database system and the related challenges involved in designing a query optimizer for such a system. Note that current spatial extensions to database systems follow approaches very similar to the ideas proposed in these works. This model is user facing in the sense that the queries of interest to the user are expressed making use of the data types and the operators provided in the model. The implementation of the operators, however, devolves into having separate implementations for each of the data type combinations (similar to the selection query example illustrated in FIGS. 1(*a*) and 1(*b*)).

Different from the extended relational models, Egenhofer and Franzosa (See, e.g., the document: M. J. Egenhofer and R. D. Franzosa, "Point-Set Topological Spatial Relations," *International Journal of Geographical Information Systems*, 5(2):161-174 (1991) (Incorporated herein by reference).) proposed a model that uses concepts from point set topology for spatial queries. In particular, this work models spatial data objects (of a single type, like lines or regions) as closed sets (that defines the underlying topological space) and uses the topological relationship between pairs of closed sets to answer spatial queries. These relationships are computed based on nine (9) possible intersections computed between the open set, boundary and complement corresponding to the closed sets. Egenhofer and Sharma (See, e.g., the document: M. J. Egenhofer and J. Sharma, "Topological Relations Between Regions in R 2 and Z 2," in D. Abel and B. Chin Ooi, editors, *Advances in Spatial Databases*, pages 316-336, Berlin, Heidelberg (1993, Springer Berlin Heidelberg) (Incorporated herein by reference).) showed the equivalence of the above model to a raster space as well, thus making it suitable for GIS queries involving raster data. Kainz et al. (See, e.g., the document: W. Kainz, M. J. Egenhofer, and I. Greasley, "Modelling Spatial Relations and Operations with Partially Ordered Sets," *International Journal of Geographical Information Systems*, 7(3):215-229 (1993) (Incorporated herein by reference).) model the same topological relations as described above, but using partially ordered sets (POSET). While theoretically elegant, there are three main shortcomings of this topological approach. First, the topological relationships are tied to a particular data type, that is, between two regions, or two lines, etc. This makes it difficult to work with complex spatial objects. Second, computing the relationships requires costly intersection tests to be performed between every pair of spatial objects, making the approach untenable for working with large spatial data sets. Third, and more importantly, while intersection-based queries are straightforward, queries such as distance joins between points, or nearest neighbors, etc., cannot be expressed using this model.

Gargano et al (See, e.g., the document: M. Gargano, E. Nardelli, and M. Talamo, "Abstract Data Types for the Logical Modeling of Complex Data," *Information Systems*, 16(6):565-583 (1991) (Incorporated herein by reference).) proposed a general alternative model for complex objects using which spatial objects are represented using a set of rectangular regions. The spatial queries can then be represented as operations over these sets. Given this representation, there is a loss of accuracy introduced in the query results. However, trying to overcome this using very small rectangles can result in a high memory overhead, and also requires expensive set operations making the practical applicability of this approach impractical.

Güting and Hartmut proposed another alternative model called Realms (See, e.g., the document: R. H. Güting and M. Schneider, "Realms: A Foundation for Spatial Data Types in Database Systems," in D. Abel and B. Chin Ooi, editors, *Advances in Spatial Databases*, pages 14-35, Berlin, Heidelberg (1993, Springer Berlin Heidelberg) (Incorporated herein by reference).) and a corresponding ROSE algebra (See, e.g., the document: R. H. Güting and M. Schneider, "Realm-Based Spatial Data Types: The Rose Algebra," *The VLDB Journal*, 4(2):243-286 (April 1995) (Incorporated herein by reference).). A Realms models the spatial data as a planar graph, where the nodes correspond to points on an integer grid (which is the Realm). The goal with this framework was to avoid floating point operations and thus any imprecision in the query computation. As data is inserted into the database, the spatial objects are "redrawn" to ensure topological consistency (such as location of intersection points etc.). There are several problems with this framework. First, even though the redrawing operation ensures that queries involving intersection tests can be efficiently and precisely computed using only integer operations, due to the distortion involved, other queries which involve any kind of distance as part of the query (e.g., distance join, nearest neighbor) cannot be accurately computed. Second, it is necessary for all query parameters to be a part of the Realm. Thus, when generating dynamic queries (common in several data analysis tasks), the query parameters will have to first be inserted into the Realm, which requires potentially several redrawings of the existing data. Then, once the query is executed, the newly inserted parameters should then be removed. Note that not only is this expensive, but it also does not undo the distortions caused by the temporary insertions. Third, queries involving spatial objects outside the Realm boundaries are not possible. This is a major drawback in modern exploratory data analysis tasks where users can dynamically change their focus depending on their ongoing analysis. Finally, similar to the extended relational models, there are separate data types for points, lines, and polygons, thus making the implementation specific to these data types, and also making it difficult to incorporate complex spatial objects composed of more than one type.

All of the above models/algebras were designed before GPUs became mainstream, and thus an implementation of these models using GPUs is non-trivial (difficult to parallelize, involves iterative algorithms like intersection computations, etc.).

Models have also been proposed that focus on moving objects. (See, e.g., the paper, J. K. Nidzwetzki and R. H. Gilting, "Distributed Secondo: An Extensible and Scalable Database Management System," *Distributed and Parallel Databases*, 35(3):197-248 (December 2017) (Incorporated herein by reference).) For GIS applications, Tomlin (See, e.g., the document: C. D. Tomlin, *Map algebra: one perspective. Landscape and Urban Planning*, 30(1-2):3-12 (1994) (Incorporated herein by reference).) proposed the Map algebra, which was designed to enable cartographers to easily specify common cartographic functions. Jeremy et al. (See, e.g., the document: J. M., R. V., and C. D. Tomlin, "Cubic Map Algebra Functions for Spatio-Temporal Analysis," *CaGIS*, 32(1):17-32 (2005) (Incorporated herein by reference).) extended the Map algebra to support temporal dimensions in the data as well. The map algebra was designed to enable cartographers to easily specify common cartographic functions. Voisard and David (See, e.g., the article A. Voisard, et al., "A Database Perspective on Geospatial Data Modeling," *IEEE TKDE*, 15(2): 226-243 (March 2002) (incorporated herein by reference).) propose a layered model specific to geographic maps to help users build new maps. From an implementation point of view, all of the above operations can be translated into spatial queries for execution, and thus an efficient spatial model will be useful in such scenarios as well.

In summary, new hardware and architectures open new opportunities for speeding up spatial queries. But at the same time, leveraging these hardware not only requires multiple implementations of spatial operations, but their implementations are also complex, especially when using hardware such as modern GPUs.

§ 2. SUMMARY OF THE INVENTION

To address the challenges outlined above, the present application describes a new geometric data representation that provides a uniform representation for different geometric objects, and a small set of composable operators capable of handling a wide variety of spatial queries. To give an intuition behind the proposed geometric representation, consider again the example in FIG. 1(*a*), but from a geometric point of view. The query can be translated into two operations performed one after the other as shown in FIG. 1(*b*). Visually (or graphically), the set of input points and the query polygon are uniformly represented as drawings on a canvas. The first operation merges the input points and the query polygon into a single canvas. The second operation computes the intersection between the points and the polygon to eliminate points outside the polygon. Unlike the traditional execution strategy described earlier, the two operations used here are independent of each other and applicable to any kind of geometry. Therefore, if the earlier example is considered, even if the restaurants were represented as polygons instead of points, the same set of operations could be applied. More importantly, as shown later in § 4.1.2.4, the same composable operations can be re-used and composed with other operators to support other spatial query types.

§ 3. BRIEF DESCRIPTION OF THE DRAWINGS

FIGS. 1(*a*) and 1(*b*) illustrate geometric reformulation of a spatial selection query.

FIGS. 2(*a*)-2(*d*) illustrate using a canvas as a uniform representation of spatial data.

FIG. 3 illustrates a canvas representing a complex object. Since all the primitives (colored differently) are part of the same object, they have the same ID.

FIGS. 4(*a*)-4(*e*) illustrate five fundamental operators. For illustrative purposes, colors are used to denote the information stored in each point of the canvas, where a white color corresponds to a null value.

FIG. 5 is a schematic representation as a plan diagram of the algebraic expression used to select points based on a polygonal constraint (left). The plan illustrates the different steps of this operation using an example input with two points (colored red and cyan)(right). For simplicity, both points are shown in a single canvas.

Figure 8:
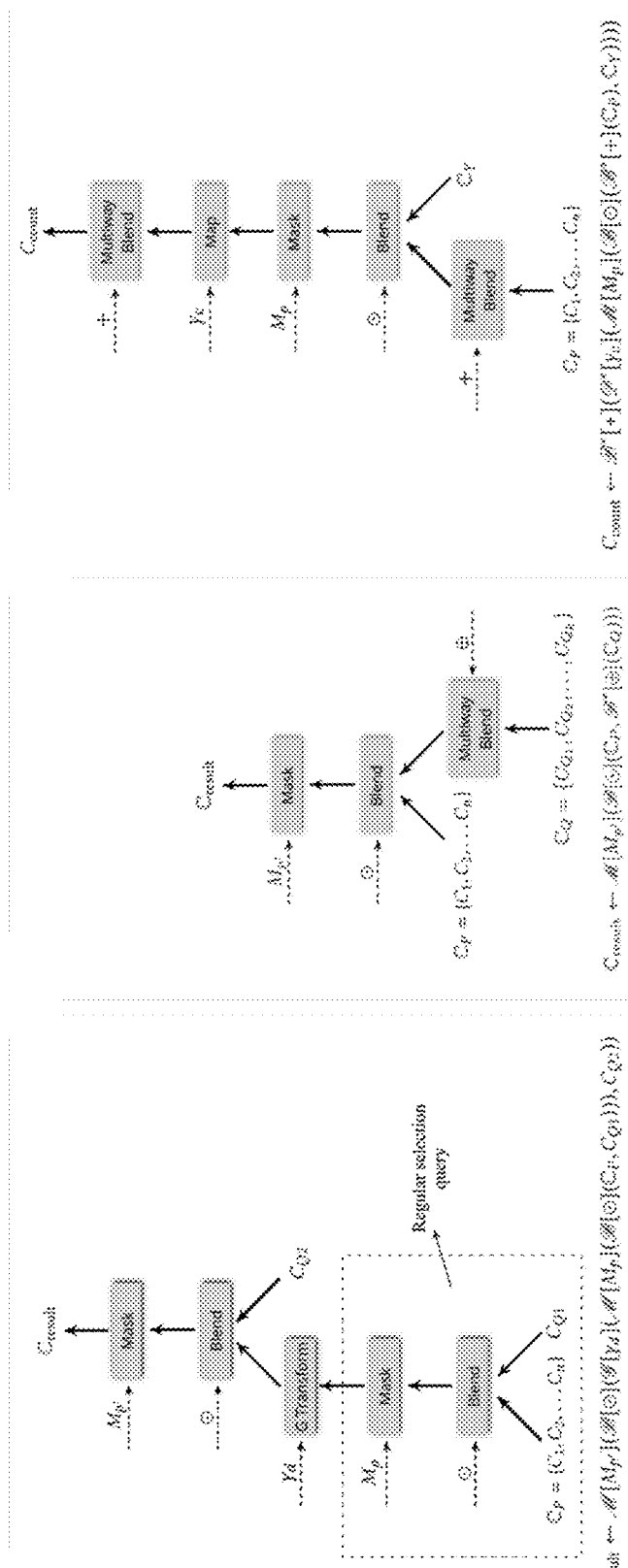

FIGS. 8(*a*)-8(*c*) illustrate examples of complex queries and alternate plan execution strategies.

Figure 9:
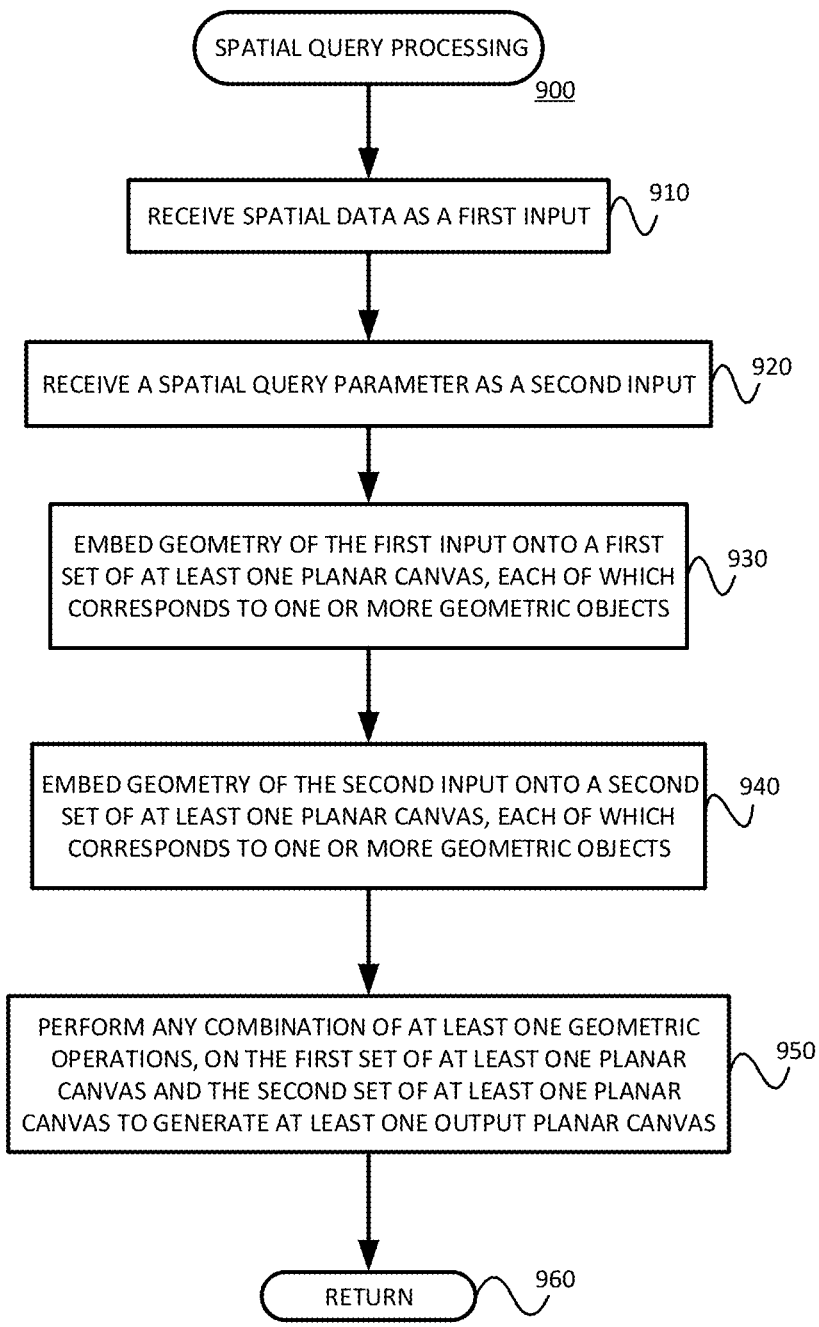

FIG. 9 is a flow diagram of an example method for performing a spatial query.

Figure 10:
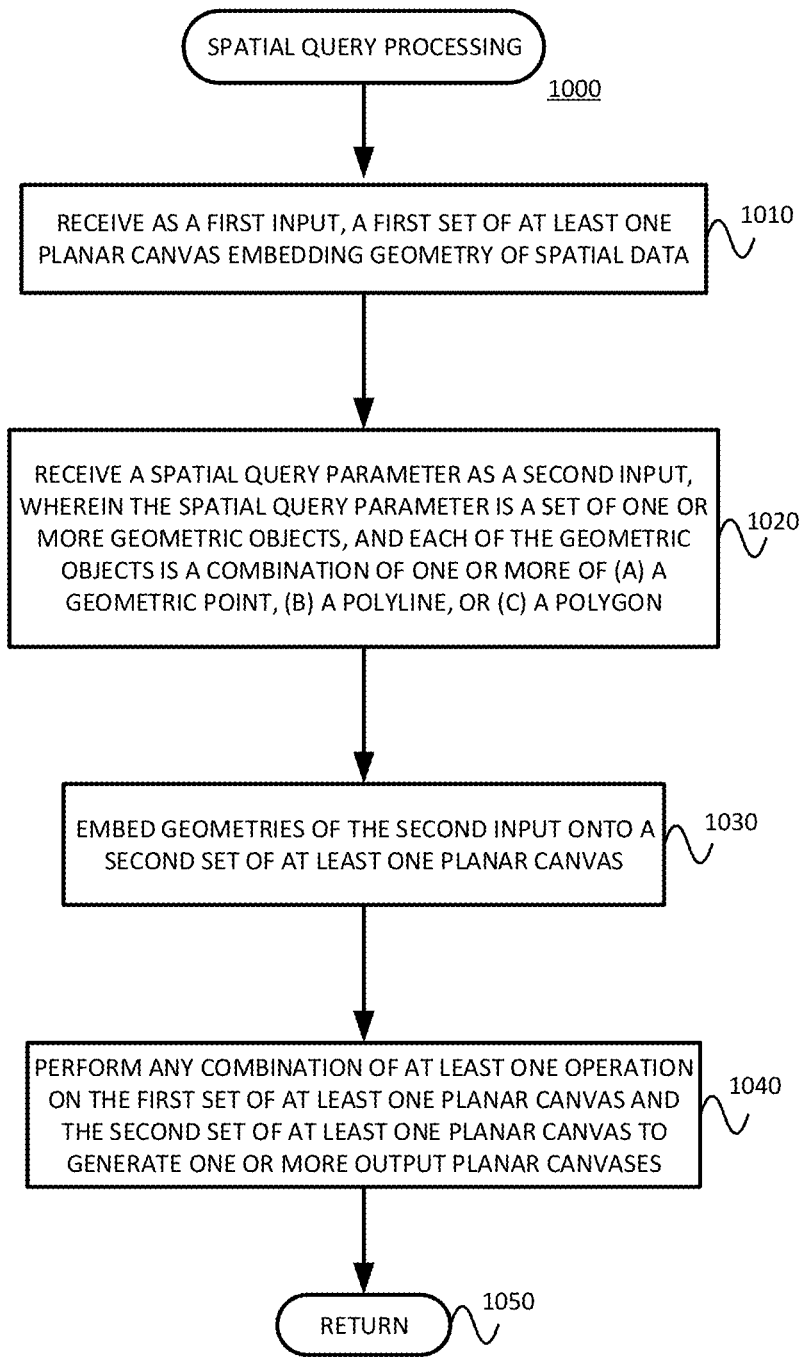

FIG. 10 is a flow diagram of an example method for performing a spatial query. This method is similar to the method of FIG. 9, but it is assumed that preprocessing has previously converted data into a canvas(es).

Figure 11:
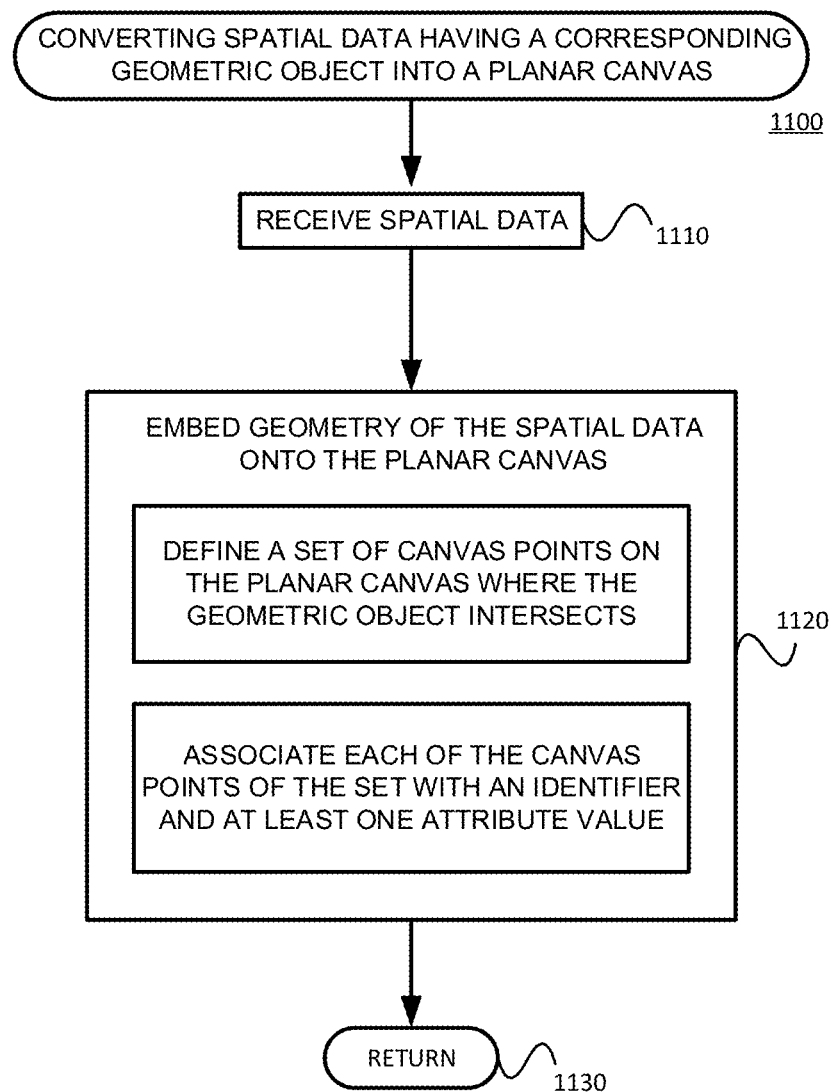

FIG. 11 is a flow diagram of an example method for converting spatial data having a corresponding geometric object into a planar canvas.

Figure 12:
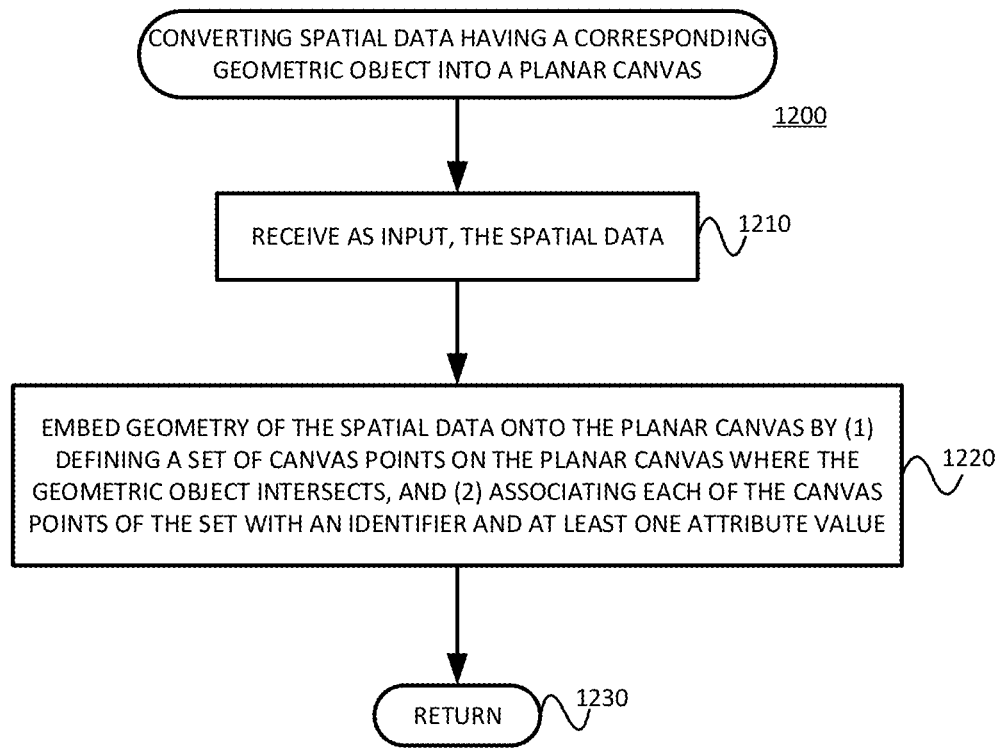
Figure 12:
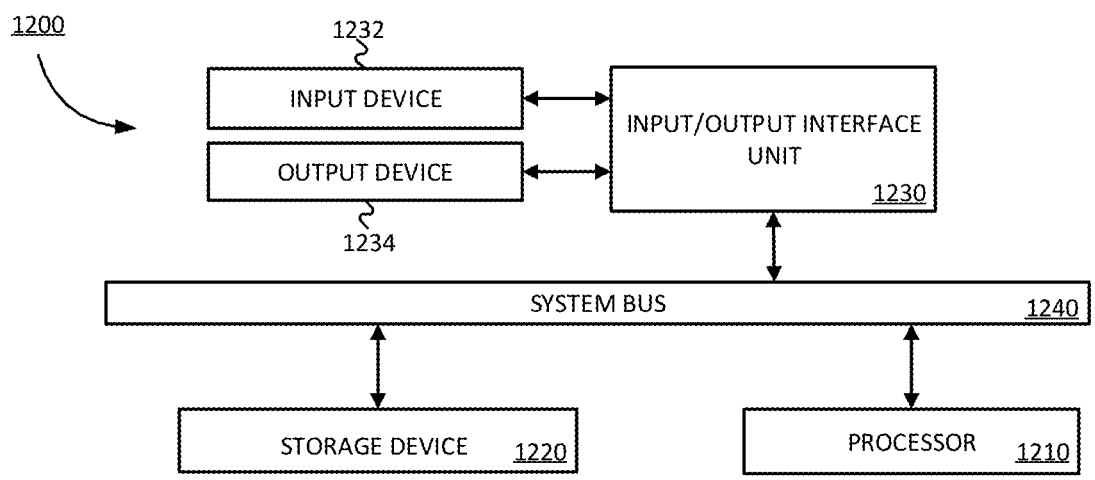

FIG. 12 is a block diagram of an example machine that may perform one or more of the methods described, and/or store information used and/or generated by such methods.

FIGS. 13(*a*)-13(*d*) illustrate the performance of an example prototype consistent with the present description, showing how it scales with input size compared to a CPU and GPU baseline.

FIG. 14 illustrates the performance of an example prototype consistent with the present description with varying polygonal constraints. (The legend is the same as in FIGS. 13(*a*)-13(*d*).)

§ 4. DETAILED DESCRIPTION

The present description may involve novel methods, apparatus, message formats, and/or data structures for performing spatial queries. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Informally, a spatial object is represented as an embedding of its geometry onto a plane, called a "canvas," and operators that are fundamental to this geometric setting are defined, similar to the ones in FIG. 1(*b*), that act on one or more of such embeddings. Given a small set of basic operators, the example representation makes it possible for implementations to focus on the efficiency of these operators, the gains from which become applicable to a variety of queries.

Example embodiments consistent with the present description can be summarized as follows:

A new geometric data representation that provides an intuitive and uniform representation for spatial data is described. (See § 4.1.1.)

Five fundamental operators designed based on common geometric operations are defined. (See § 4.1.2.1.) It is shown that these five fundamental operators are: expressive and able to represent all standard spatial queries; and closed, allowing spatial operators to be composed to represent complex queries. (See § 4.1.2.4.6.)

Example implementation strategies are described, including an example implementation of a subset of the proposed operators that demonstrates: (1) how the proposed geometric data representation and composable operators are naturally suited for GPUs; and (2) how example composable operators can be re-used in different queries. Example implementations consistent with the present description achieve over two orders of magnitude speedup over a custom CPU-based implementation, and consistently outperforms custom GPU-based approaches as well. (See § 4.4.2.)

The compatibility of the proposed operations with the relational model and its utility for query optimization is discussed. (See § 4.4.5.)

§ 4.1 Definitions and Representation of Spatial Data

§ 4.1.1 Data Representation

This section formalizes the notion of a spatial data set, and then defines the concept of a canvas, the spatial analogue of a relational tuple.

§ 4.1.1.1 Spatial Data

As discussed in § 1.2 above, the inventors believe that the key reason why current spatial operations are not flexible is because they must handle the different representations for geometric data types. Consequently, the inventors believe it is important to have a uniform representation for the geometry that is independent of underlying types. To address this, the geometry is represented schematically using a single type called "geometric object." The geometric object type is defined such that it can conceptually represent any complex geometric structure.

DEFINITION 1 (GEOMETRIC OBJECT). A "geometric object" is defined as a collection of geometric primitives.

DEFINITION 2 (GEOMETRIC PRIMITIVE). A d-dimensional geometric primitive (or simply a d-primitive) is defined as a d-manifold (with or without a boundary).

Informally, a d-manifold is geometric space in which the local neighborhood of every point represents $\mathbb{R}^d$, where $\mathbb{R}$ is the set of real numbers. In the context of spatial data in two-dimensional (2D) spaces, the geometric primitives will be a subset of $\mathbb{R}^d$, where $0 \leq d \leq 2$. Naturally, the example embodiments consistent with the present description can be extended to handle spatial data in more or less dimensions. A 0-primitive is a point, a 1-primitive is a line or a polyline and 2-primitives, such as polygons (with or without holes), include any subset of $\mathbb{R}^2$ that is neither a polyline nor a point.

A "spatial data set" can be defined in terms of geometric objects as follows:

DEFINITION 3 (SPATIAL DATA). A "spatial data set" consists of one or more attributes of type geometric object.

Note that the above definition allows geometric objects of arbitrarily complex shapes composed using a heterogeneous set that contains zero or more points (i.e., 0-primitives), zero or more polylines (i.e., 1-primitives), and/or zero or more polygons (or 2-primitives). However, note that most geometric objects common in real world data sets are primarily only points (e.g., locations of restaurants, hospitals, bus stops, etc.), only polylines (e.g., road networks), or only polygons (e.g., state or city boundaries).

§ 4.1.1.2 Canvas

A "canvas" is defined to capture the geometric structure of a spatial data set explicitly. As mentioned above, assume without loss of generality that the dimensions of the geometric primitives composing a geometric object in a spatial data set is either 0, 1 or 2. Let S be a set of k-tuples, where $k \geq 1$, such that the empty set is an element of S (i.e., $\emptyset \in S$). Given this, a "canvas" is formally defined as follows.

DEFINITION 4. (Canvas) A "canvas" (C) is a function C: $\mathbb{R}^2 \rightarrow S^3$ that maps each point in $\mathbb{R}^2$ to a triple (s[0], s[1], s[2])$\in$(S×S×S), where the $i^{th}$ element of the triple, s[i], stores information (as a k-tuple) corresponding to i-dimensional geometric primitives.

DEFINITION 5. (Empty Canvas) A canvas is "empty" if and only if C maps all points in $\mathbb{R}^2$ to $(\emptyset, \emptyset, \emptyset)$.

A canvas is analogous to a tuple in the relational model. A canvas stores, for each point in $\mathbb{R}^2$, information corresponding to the geometric primitives that intersects that point. This information is captured by the elements of the set S (described in more detail below).

Given a spatial data set, each record of this data may be represented using one or more canvases—one per geometric object attribute of the data. For ease of exposition, consider a spatial data set having a single geometric object attribute. Consider a geometric object o corresponding to one of the records in this data. Let $o=\{g_1, g_2, g_3, \ldots, g_n\}$, where $g_i$ is a geometric primitive having dimension $dim(g_i)$, where $0 \leq dim(g_i) \leq 2$, $\forall i$. A canvas representation of the geometric object o is defined as follows.

DEFINITION 6. (Canvas representation of a geometric object) A canvas corresponding to a geometric object is a function $C_o$: $\mathbb{R}^2 \rightarrow S^3$ such that $\forall d \in [0, 2]$ $$C_o(x, y)[d] = \begin{cases} s_d \neq \emptyset \in S, & \text{if } \exists i \mid dim(g_i) = d \text{ and} \\ & g_i \text{ intersects } (x, y) \\ \emptyset & \text{otherwise} \end{cases}$$

While the above definition is general and allows for a wide variety of information to be stored through S, the following definition which, as discussed in § 4.1.2.4, is sufficient for a rich class of objects and queries, is used.

The set S used in the above definition is called the "object information set," which is defined as follows.

DEFINITION 7. (Object Information Set S) The "object information set" S is defined as a set of triples ($v_0$, $v_1$, $v_2$) where $v_0$ stores a unique identifier (or a pointer) of the record corresponding to the geometric object, and where $v_1$ and $v_2$ are real numbers storing meta data related to the canvas.

The range of the canvas function C can thus be represented as a 3×3 matrix, where each row corresponds to the corresponding primitive dimension (i.e., the 0-primitive, the 1-primitive and the 2-primitive). Notation is abused to represent the empty set triple $(\emptyset, \emptyset, \emptyset)$ simply as $\emptyset$.

Examples of the foregoing data representation are now provided. A first example is described with reference to FIGS. 2(a)-2(d). A second example is described with reference to FIG. 3. FIG. 2(a) illustrates example point data. FIG. 2(b) illustrates two canvases corresponding to the first two records of the table. The [0,0] element of the matrix (corresponding to the 0-primitive) stores the unique ID corresponding to the record. All points on a canvas except the data location maps to a null value. FIG. 2(c) illustrates example polygon data. FIG. 2(d) illustrates two canvases corresponding to the first two records. Here, all points inside a polygon will map to the same value, with the element [2,0] (corresponding to the 2-primitives) storing the unique ID. Points on the canvas outside the polygon will map to a null value. Consider the two example data sets in FIGS. 2(a) and 2(c). The first data set corresponds to the set of restaurants in a city (a), while the second data set corresponds to the neighborhood boundaries of this city (c). FIGS. 2(b) and 2(d) illustrate the canvas representations corresponding to two records from each of these two data sets. Note that in this example, only the identifier element of the object information set is used. The values of the other elements are initialized depending on the query scenario. (See § 4.1.2.4). Note that since the restaurant locations are represented as points, the corresponding data has data in the first row (corresponding to the 0-primitive) in the 3×3 matrix. Note further that since the neighborhoods are represented as polygons, the corresponding data has data in the third row (corresponding to the 2-primitive) in the 3×3 matrix.

Figure 3:
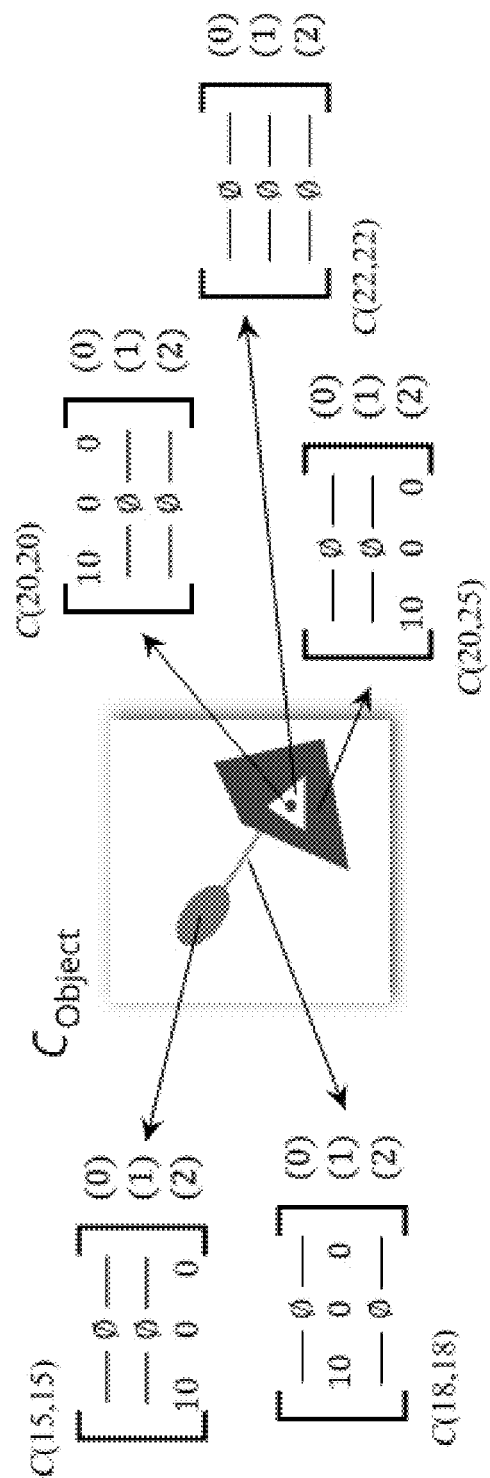

The complex geometric object shown in FIG. 3 consists of two polygons (an ellipse and a polygon with a hole) connected by a line, with the hole also containing a point. This is represented in the canvas by mapping the regions corresponding to the different primitives using the appropriate rows in the matrix (for point, line, polygon).

§ 4.1.2 Example Operators

Composable operators for use with the canvas representation of a spatial data set are now described. The following nomenclature is used to represent the composable operators that receive as input zero or more canvases:

$$Op[P_1, P_2, \ldots](C_1, C_2, \ldots, C_n)$$

where Op is the operator name, $P_i$, $\forall i$, the parameters of the operator, and $C_j$, $\forall j$, the canvases input to the operator. The output of all the operators is always a non-zero number of canvases. Thus, the proposed set of composable operators is closed by design.

As described next, the set of operators may be classified as fundamental operators, derived operators, and utility operators. Each class of operators is described in further detail below.

§ 4.1.2.1 Fundamental Operators

Fundamental composable operators are inspired by common computer graphics operations supported by the GPU. FIGS. 4(a)-4(e) illustrates five fundamental operators.

Geometric Transform: $C'=\mathcal{G}[\gamma](C)$: This operator takes as input a single canvas C and outputs a canvas C' in which all the geometric objects of C are transformed to a new position in C' defined by the parameter function. Here, the parameter function can be defined in two ways:

1. $\gamma: \mathbb{R}^2 \to \mathbb{R}^2$
2. $\gamma: S^3 \to \mathbb{R}^2$

In the first case, the new position (x', y') of a geometry is dependent on its current position (x, y):

$$C'(\gamma(x,y))=C(x,y)$$

Examples of such functions include operations such as rotation, translation, etc. The example in FIG. 4(a) rotates and translates (moves) the polygon object to a different position.

A scenario where this operator is useful is when different spatial data sets in a database use different coordinate systems. Thus, when performing binary or n-ary operations on canvases from these data sets, the geometry is converted into a common coordinate system first. The parameter function can be defined appropriately for this purpose.

In the second case, the new position (x', y') of the geometry is dependent on the information stored at the current position C(x, y):

$$C'(\gamma(C(x,y)))=C(x,y)$$

Such a transformation is useful, for example, when one is interested in accumulating values (e.g., for aggregation queries) corresponding to a geometric object. In this case, the function can be defined to move all points having the same object identifier to a unique location.

Value Transform: $C'=\mathcal{V}[f](C)$: This unary operator outputs a canvas C' in which the information corresponding to the geometries is modified based on the parameter function f. That is, $$C'(x,y)=f(x,y,C(x,y))$$

where, $f: \mathbb{R}^2 \times S^3 \to S^3$ is a function that changes the object information based on its location and/or value. FIG. 4(b) illustrates an example of this operation where the shading or color of the polygon in the canvas is changed from (e.g. from blue to orange).

Mask: $C'=\mathcal{M}[M](C)$: The mask operator is used to filter regions of canvas so that only regions satisfying the given condition specified by $M \subset S3$ are retained. Formally, the application of this operator results in the canvas C' such that $$C'(x, y) = \begin{cases} C(x, y) & \text{if } C(x, y) \in M \\ \emptyset & \text{otherwise} \end{cases}$$

For example, this can be used to accomplish the select intersection operation shown in FIG. 1(b) and FIG. 4(c).

Blend: $C'=\mathcal{B}[\odot](C_1,C_2)$: Blend is a binary operator used to merge two canvases into one. The blend function $\odot: S^3 \times S^3 \to S^3$ defines how the merge is performed:

$$C'(x,y)=C_1(x,y) \odot C_2(x,y)$$

The merge operation used in FIG. 1(b) is an instance of the blend function. Another example is shown in FIG. 4(d).

Dissect: $\{C1, C2, \ldots Cn\}=\mathcal{D}(C)$: The dissect operation splits a given canvas into multiple non-empty canvases, each corresponding to a point $(x, y) \in \mathbb{R}^2$ having $C(x, y) \neq \emptyset$. That is, a new canvas $C_i$ is generated corresponding to a non-null point (x, y) such that:

$$C_i(x', y') = \begin{cases} C(x, y) & \text{if } (x', y') = (x, y) \\ \emptyset & \text{otherwise} \end{cases}$$

For example, in FIG. 4(e), a canvas encoding 4 points is split into 4 canvases, each corresponding to one of those points. As shown later, one of the uses of the dissect operator is for queries involving aggregations over geometries with 1- and 2-primitives (such as polygons).

§ 4.1.2.2 Derived Operators

It is common for certain combinations of fundamental operators to be repeatedly used for various queries. These combinations are represented as derived operators. A few examples of particularly useful derived operators are described below.

Multiway Blend: $C'=\mathcal{B}*[\odot](C_1, C_2, \ldots, C_n)$: This is a n-ary operator that takes as input n canvases and generates a single canvas after blending all these n canvases in the given order.

$$C'=\mathcal{B}[\odot](C_1, \mathcal{B}[\odot](C_2, \mathcal{B}[\odot]C_3, \ldots)))$$

Note that if the blend function $\odot$ is associative, then it allows relaxing the grouping of the different blend operations, thus providing more flexibility while optimizing queries.

Map: $\{C_1, C_2, \ldots, C_n\} = \mathcal{D}*[\gamma](C)$: Map is a composition of a dissect followed by a geometric transform.

$$\{C_1, C_2, \ldots, C_n\} = \mathcal{G}[\gamma]\mathcal{D}(C)$$

This operator is mainly useful to align all the canvases resulting from the dissect. In such a case, is typically defined as a constant function:

$$\gamma(x,y)=(x_c,y_c)$$

where $x_c$ and $y_c$ are constants.

Note that, without loss of generality, it is assumed the above notation of providing multiple canvases as input to a unary operator as equivalent to applying the operator individually to each of the input canvases.

§ 4.1.2.3 Utility Operators

Utility operators are primarily used to generate canvases based on a given set input parameters. Consider the following three types of utility operators.

Circle $C=\text{Circ}[(x, y), r]()$: This operator takes as input a point $(x, y)$ and a radius $r$, and returns a canvas corresponding to a circle whose center lies on $(x, y)$.

Rectangle $C=\text{Rect}[l_1, l_2]()$: This operator takes as input locations of the diagonal end points $l_1$ and $l_2$, and returns a canvas corresponding to a rectangle.

Half Space $C=\text{HS}[a, b, c]()$: This operator takes as input the equation of a line specified as $ax+by+c=0$, and returns a canvas representing the following half space defined by the parameters:

$$ax+by+c<0.$$

§ 4.1.2.4 Examples Illustrating Expressiveness of Example Operators

To demonstrate the expressiveness of the proposed set of operators, this section describes how common spatial queries can be represented as expressions including one or more operations (which may be referred to simply as "expressions"). The classification of spatial queries used by Eldawy et al. (See, e.g., the document: A. Eldawy and M. F. Mokbel, "The Era of Big Spatial Data: A Survey," *Found. Trends databases*, 6(3-4):163-273 (December 2016) (Incorporated herein by reference).) is extended for this purpose. In particular, spatial queries are categorized as: selection, join, aggregate, nearest neighbor, and geometric queries. Note that this is a super set of the queries that are evaluated in a state-of-the-art experimental survey by Pandey et al. (See, e.g., the document: V. Pandey, A. Kipf, T. Neumann, and A. Kemper, "How Good are Modern Spatial Analytics Systems?" *Proc. VLDB Endow.*, 11(11):1661-1673 (July 2018) (Incorporated herein by reference).)

For ease of exposition, only point and polygonal data sets are considered. It is straightforward to express similar queries for other types of spatial data sets with lines, or more complex geometries (combination of points, lines, and polygons). Without loss of generality, assume that the output of the different operators does not include empty canvases.

§ 4.1.2.4.1 Selection Queries

Spatial selection queries can be classified into three types: polygonal selection, range selection, and distance-based selection. While nearest-neighbor-based selection could also be in this category, it is placed in a separate class. (See § 4.1.2.4.4.) Selection queries that have a polygonal constraints are considered first, and then the expressions for other types of selection queries are considered.

Polygonal Selection of Points. Let $D_P$ be a data set consisting of a set of points. Let $\{(x_1, y_1); (x_2, y_2), \ldots, (x_n, y_n)\}$ be the coordinates corresponding to the location of these points. Let Q be any arbitrary-shaped polygon. Consider the following spatial query expressed in an SQL-like syntax:

SELECT * FROM $D_P$ WHERE Location INSIDE Q

Note that this is the same query used for the example in FIG. 1(*a*). Using the proposed data representation, let $\mathbb{C}_P=\{C_1, C_2, \ldots, C_n\}$ be the set of canvases corresponding to each point (record) in $D_P$. Let the canvas $C_i$ corresponding to the $i^{th}$ record be defined as follows:

$$C_i(x, y)[0] = \begin{cases} (id, 1, 0), & \text{if } (x, y) = (x_i, y_i) \\ \emptyset & \text{otherwise} \end{cases}$$

$$C_i(x, y)[1] = \emptyset$$

$$C_i(x, y)[2] = \emptyset$$

Here, id corresponds to the unique identifier mapping the canvas to the corresponding record in $D_P$. The second element of $C_i(x, y)[0]$ is used to keep count of the points incident on the location $(x, y)$, which in this case is 1. The third element is ignored for this query. Let the canvas $C_Q$ corresponding to the query polygon Q be defined as follows:

$$C_Q(x, y)[0] = \emptyset$$

$$C_Q(x, y)[1] = \emptyset$$

$$C_Q(x, y)[2] = \begin{cases} (1, 1, 0), & \text{if } (x, y) \text{ falls outside } Q \\ \emptyset & \text{otherwise} \end{cases}$$

Similar to the case of points above, the elements $C_Q(x, y)[2][0]$ and $C_Q(x, y)[2][1]$ stores the id of the query polygon (set to 1) and count of 2-primitives incident on a given location respectively. Using the above defined canvases, the select query can be expressed by the following operation(s):

$$\mathbb{C}_{result} \leftarrow \mathcal{M}[M_P](\mathcal{B}[\odot](\mathbb{C}_P, C_Q)) \text{ where,}$$

$$\forall s_1, s_2 \in \mathcal{S}^3 \; s_1 \odot s_2 = \begin{bmatrix} s_1[0][0] & s_1[0][1] & s_1[0][2] \\ - & \emptyset & - \\ s_2[2][0] & s_2[2][1] & s_2[2][2] \end{bmatrix} \text{ and}$$

$$M_P = \{s \in \mathcal{S}^3 \mid s[0] \neq \emptyset \text{ and } s[2][0] = 1\}$$

Figure 5:
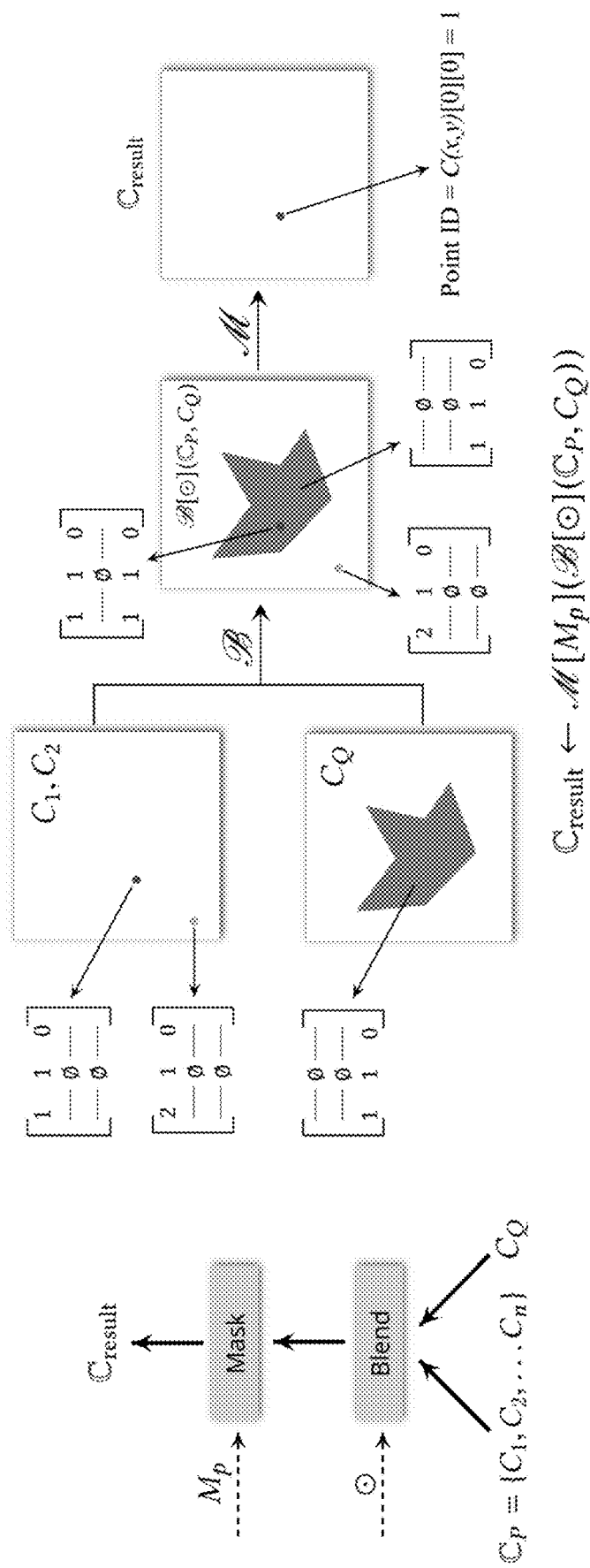

Similar to the example in FIG. 1(*b*), the above expression first merges the input data with the query polygon using the blend operator, and then uses the mask operator to select only the intersection (a location is part of the intersection if both, a 1-primitive and 2-primitive are incident on it). FIG. 5 visualizes the above expression as a plan diagram, and illustrates the different steps for two examples when a point is inside the query polygon (and hence part of the result), and when a point is outside respectively.

Polygonal Selection of Polygons. Let $D_Y$ be a data set consisting of a set of polygons. Let $\{Y_1, Y_2, \ldots, Y_n\}$ be the set of polygons associated with each record of the data set. As before, the polygons can take any shape. Let Q be another arbitrary shaped polygon. Let the canvases corresponding to polygons in $D_Y$, $\mathbb{C}_Y$, be defined as follows:

$$C_i(x, y)[0] = \emptyset$$

$$C_i(x, y)[1] = \emptyset$$

$$C_i(x, y)[2] = \begin{cases} (id, 1, 0), & \text{if } (x, y) \text{ falls outside } Y \\ \emptyset & \text{otherwise} \end{cases}$$

Let the canvas corresponding to query polygon Q be defined as before. Now, consider the following selection query, similar to the one above, but over $D_Y$:

SELECT * FROM $D_Y$ WHERE Geometry INTERSECTS Q

This query can be expressed with the following operation(s):

$$\mathbb{C}_{result} \leftarrow \mathcal{M}[M_y](\mathcal{B}[\oplus](\mathbb{C}_Y, C_Q)) \text{ where,}$$

$$\forall s_1, s_2 \in S^3 \; s_1 \oplus s_2 = \begin{bmatrix} - & \emptyset & - \\ - & \emptyset & - \\ s_1[2][0] & s_1[2][1] & s_1[2][2] \end{bmatrix} \text{ and}$$

$$M_y = \{s \in S^3 \mid s[2][1] = 2\}$$

Figure 6:
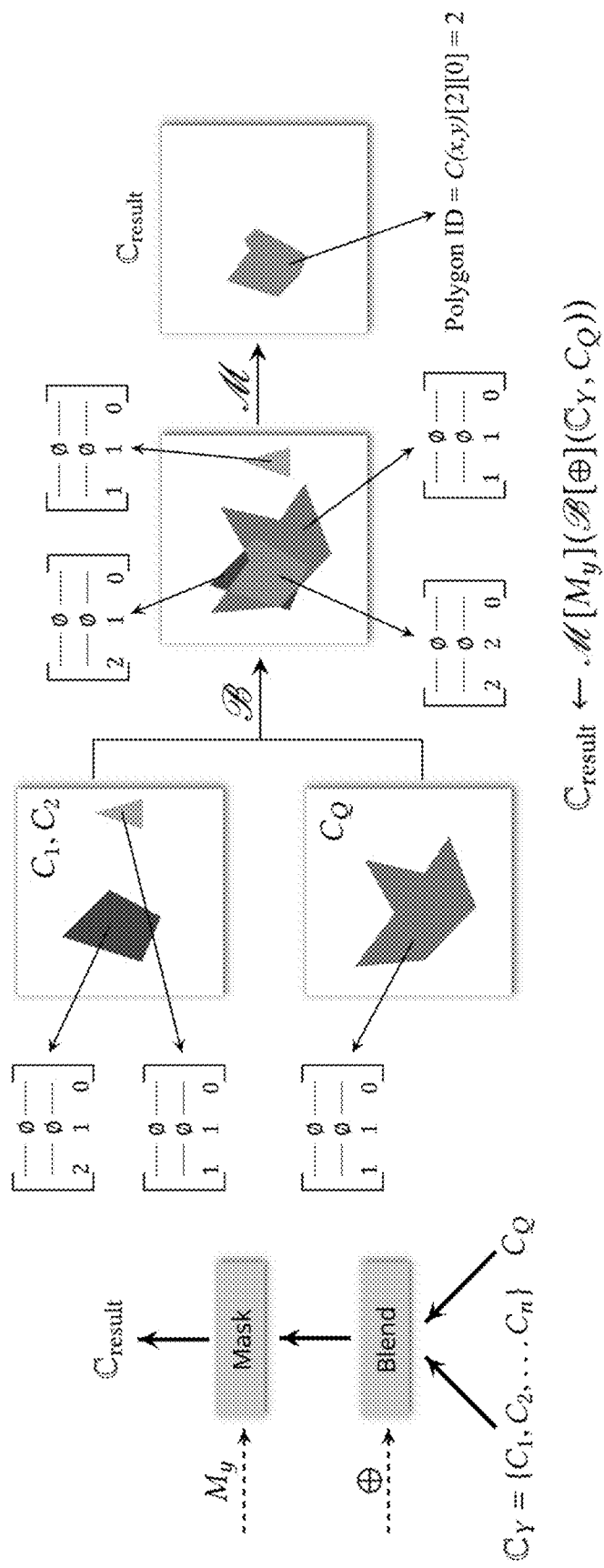
FIG. 6 is a plan diagram corresponding to the algebraic expression used to select polygons based on a polygonal constraint (left). The plan illustrates this operation using two input polygons (colored red and cyan) (right), which are shown in a single canvas.

Note that unlike in the previous case of selecting points, since both the data as well as the query consist of only polygons, both the data canvas and the query canvas store information only for 2-primitives. Hence, the second element of the information tuple is used in this case to compute the intersection (i.e., locations having two 2-primitives incident on them). FIG. 6 shows the operational expression using a plan diagram, and illustrates two examples denoting selection and non-selection scenarios, respectively.

Selection Using Other Spatial Constraints. In addition to polygonal constraints, selection queries over spatial data may also involve other types of spatial constraints. Commonly used spatial constraints include range constraints and distance-based selection. It is easy to extend the expressions used for polygonal constraints to these scenarios as follows.

Rectangular Range Constraints: This class of queries requires the selection of spatial objects that intersect a 2-d range. To execute such queries, the query polygon is simply replaced by a rectangle, the canvas for which can be created using the utility operator:

$$C_Q \leftarrow \text{Rect}[l_1, l_2]()$$

where $l_1$, $l_2$ denotes the diagonal endpoints of the rectangle range.

One-Sided Range Constraints: In this scenario, the queries require selecting geometries that intersect a given half-space $ax+by+c<0$ (note that this is a more generic formulation of queries involving constraints such as $x<c$ or $y<c$). Again, the utility operator can be used to generate the required query canvas as a replacement for the query polygon.

$$C_Q \leftarrow HS[a,b,c]()$$

Distance-based Selection: In this case, the queries require the selection of geometries that lie within a given distance d of a query point $(x_q, y_q)$. This essentially translates to using a circle with radius d centered at $(x_q, y_q)$ as the query polygon, the canvas for which can also be created using the utility operators.

$$C_Q \leftarrow \text{Circ}[(x_q, y_q), d]()$$

Given the possibility to adapt these three types of spatial constraints to a polygon, the remainder of this section will focus only on polygonal constraints.

§ 4.1.2.4.2 Join Queries

Spatial join queries can be broadly classified into three types: Type I. points ⋈ polygons join; Type II. polygons ⋈ polygons join; and Type III. points ⋈ points join. Type III join query is also commonly known as a distance join. As in the previous section, one set of points (say the right hand side (RHS): note that the distance join is a join between two sets of points, one on each side of the join operator) of the distance join can be converted into a collection of circles to transform this to a points ⋈ polygons join query. Therefore, this section focuses on the first two types of join queries.

Let $D_P$ and $D_Y$ be a point data set and a polygon data set respectively. A Type I join query between these two data sets is typically specified as follows:

SELECT * FROM $D_P$, $D_Y$
WHERE $D_P$.Location INSIDE $D_Y$.Geometry

Similarly, let $D_{Y1}$ and $D_{Y2}$ be two polygon data sets. A Type II join query between these two data sets can be specified as follows:

SELECT * FROM $D_{Y1}$, $D_{Y2}$
WHERE $D_{Y1}$.Geometry INTERSECTS $D_{Y2}$.Geometry The above two join queries are equivalent to performing selection queries, one for each record (canvas) from $D_Y$ and $D_{Y2}$ respectively. Thus, conceptually, the expression for joins is the same as the corresponding selection queries, with the exception that a single query polygon is instead replaced with a collection of polygons. A Type I join query can then be realized using the following expression:

$$\mathbb{C}_{result} \leftarrow \mathcal{M}[M_P(\mathcal{B}[\odot](\mathbb{C}_P, \mathbb{C}_Y)),$$

while a Type II join query can be realized using:

$$\mathbb{C}_{result} \leftarrow \mathcal{M}[M_Y(\mathcal{B}[\oplus](\mathbb{C}_{Y1}, \mathbb{C}_{Y2})).$$

Here, $\mathbb{C}_P$, $\mathbb{C}_Y$, $\mathbb{C}_{Y1}$ and $\mathbb{C}_{Y2}$ are collections of canvases corresponding to the data sets $D_P$, $D_Y$, $D_{Y1}$ and $D_{Y2}$, respectively. The different parameters of the operators in the above expressions remain the same as what was used for their selection counterparts. Similar to the join operator in the relational model, the implementation can be done in several ways. The most straightforward approach is using nested loops for the blend operation. Alternatively, the presence of spatial indexes can be used to improve the efficiency of this operation.

§ 4.1.2.4.3 Aggregate Queries

The third class of queries common on spatial data are spatial aggregation queries. Two types of such queries—aggregating the results from a selection, and the aggregation required for a group-by over a join—are described below.

Aggregation over a Select. Consider first a simple count of the results from a selection query:

SELECT COUNT(*) FROM $D_P$ WHERE Location INSIDE Q

This query can be realized using the expression:

$$C_{count} \leftarrow \mathcal{B}^*[+]\mathcal{G}[\gamma_c](C_{result})) \text{ where}$$

$$\gamma_c: S^3 \rightarrow \mathbb{R}^2 \text{ is defined such that}$$

$$\forall s \in S^3, \gamma_c(s) = (s[2][0], 0), +: S^3 \times S^3 \rightarrow S^3 \text{ is defined as}$$

$$s_1 + s_2 = \begin{bmatrix} 0 & s_1[0][1] + s_2[0][1] & 0 \\ - & \emptyset & - \\ s_2[2][0] & s_2[2][1] & s_2[2][2] \end{bmatrix}$$

$$C_{result} \leftarrow \mathcal{M}[M_P](\mathcal{B}[\odot](C_P, C_Q))$$

is the set of canvases resulting from the selection operation (same as in § 4.1.2.4.1 above).

Figure 7:
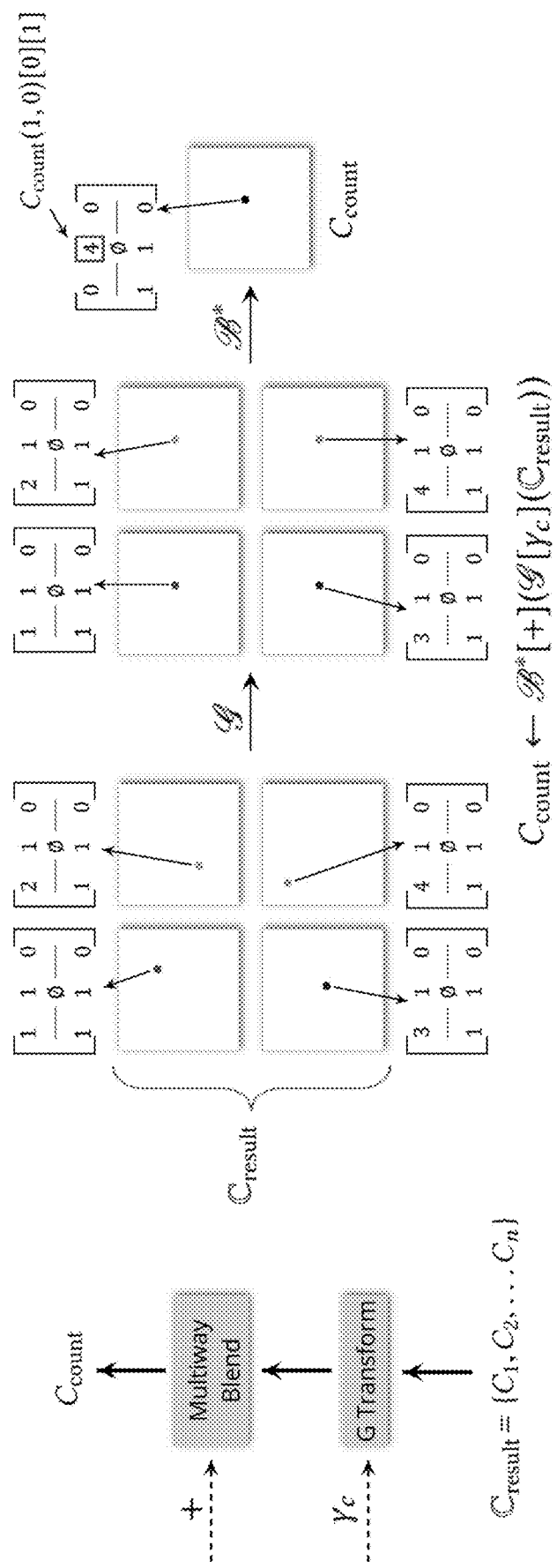
FIG. 7 is a plan diagram for aggregating the results from a select query (left). The example (right) uses the results from a select sub-query that returns four points, and illustrates the workflow that counts the results.

Basically, each canvas (corresponding to a point) satisfying the selection constraint is transformed to a constant location (1, 0) (recall that the id of the query polygon Q is 1), and the resulting canvases are merged together to compute the required summation. (See FIG. 7.) The value of $C_{count}(1, 0)[0][1]$ stores the resulting count. Note that the second element of the tuple corresponding to the 0-primitives is used for this operation, while this was not necessary when performing only a select.

Instead of count, if the query requires computing other distributive (e.g., sum, minimum, maximum) or holistic (e.g., average) aggregations over a given attribute, then the third element of the tuple corresponding to the 0-primitives can be used to store the value corresponding to this attribute, and the + function can be modified appropriately. For example, let A be a real-valued attribute of the data set $D_P$. Consider the following query:

SELECT SUM(A) FROM $D_P$ WHERE Location INSIDE Q

This query can be realized using the same expression as above by defining $C_i \in \mathbb{C}_P$ and +, respectively, as follows:

$$C_i(x, y)[0] = \begin{cases} id, 1, A[i]) & \text{if } (x, y) = (x_i, y_i) \\ \emptyset & \text{otherwise} \end{cases}$$

$$C_i(x, y)[1] = \emptyset$$

$$C_i(x, y)[2] = \emptyset$$

$$s_1 + s_2 = \begin{bmatrix} 0 & s_1[0][1] + s_2[0][1] & s_1[0][2] + s_2[0][2] \\ - & \emptyset & - \\ s_2[2][0] & s_2[2][1] & s_2[2][2] \end{bmatrix}$$

In this scenario, the value of $C_{result}(1, 0)[0][2]$ maintains the required sum.

Aggregation over a Join. The second type of aggregation queries consist of a group-by operation over a spatial join. In particular, consider the following query:

SELECT COUNT(*) FROM $D_P$, $D_Y$
WHERE $D_P$.Location INSIDE $D_Y$.Geometry
GROUP BY $D_Y$.ID The expression used for aggregations over select works for this query as well:

$$C_{count} \leftarrow \mathcal{B}^*[+](\mathcal{G}[\gamma_c](C_{result}))$$

where $$C_{result} \leftarrow \mathcal{M}[M_P](\mathcal{B}[\odot](C_P, C_Y)).$$

When using the expression for a join, each of the polygons have a unique id. Hence, the join result corresponding to a point-polygon pair that satisfies the containment constraint will be moved to the location (id, 0) corresponding to that polygon. Thus, the final multiway blend operation will individually count points within each of the polygons in $D_Y$. The value $C_{count}(id, 0)[0][1]$ stores the value corresponding to polygon with ID.

§ 4.1.2.4.4 Nearest Neighbor Queries

Consider the following nearest-neighbor-based query template that finds the k points closest to a given query point $X(x_p, y_p)$ (kNN query).

SELECT * FROM $D_P$ WHERE Location∈KNN(X, k)

Without loss of generality, assume that the distances of points in $D_P$ to query point X are totally ordered (i.e., assume that no two distances are the same). In the presence of a clash, the points can be perturbed by an infinitesimally small distance c to ensure the total order condition is satisfied.

One way to answer this query is to first find the distance r such that there are exactly k points within the circle centered at X with radius r. Then, the distance-based selection can be used to obtain the query result. This workflow can be accomplished using the proposed operations as follows. Let $\mathbb{C}_X$ be a set of circles centered at X have increasing radii. (Conceptually there are infinite number of circles, but in practice, a finite number of circles can be created with small increments in radii up to a maximum radius.) This can be accomplished by using the Circ( ) utility operator. Let the id of each circle c be the radius of c. Then, the required radius r to identify the k nearest neighbors can be obtained using the following expression:

$$\mathbb{C}_r \leftarrow \mathcal{D}^*[\gamma_0] \cdot \mathcal{M}[M_r](C_{count}))$$

where $$M_r = \{s \in S^3 | s[0][1] = k\},$$

$\gamma_0: S^3 \rightarrow \mathbb{R}^2$ is defined as:

$$\forall s \in S^3, \gamma_0(s) = (0,0),$$

and $$\mathbb{C}_{count} \leftarrow \mathcal{B}^*[+](\mathcal{G}[\gamma_c](\mathcal{M}[M_P](\mathcal{B}[\odot](\mathbb{C}_P, \mathbb{C}_Y))))$$

is the same join-group-by aggregation used above. Essentially, the mask operation is applied onto the result from the aggregation query to remove all circles containing less than or greater than k points, followed by a map to obtain individual canvases for each valid radius. Therefore, C(0, 0)[2][0], $\forall C \in \mathbb{C}_r$ has the ids of canvases corresponding to the circles having exactly k points inside them. Since the ids correspond to the radius of the respective circles, this can in turn be used to perform a distance-based selection to complete the kNN query.

§ 4.1.2.4.5 Computational Geometry Queries

The final class of queries described is the set of computational geometry queries. These include queries such as computing the Voronoi diagram, spatial skyline, and convex hull (See, e.g., the document: A. Eldawy and M. F. Mokbel, "The Era of Big Spatial Data: A Survey," *Found. Trends databases*, 6(3-4):163-273 (December 2016) (Incorporated herein by reference).). While it might not be straightforward to realize all of these queries as expressions of one or more operations, the provided operators can be used as part of a stored procedure to execute some of them. For example, consider a query to compute the Voronoi diagram for a given set of points $\{(x_1, y_1), (x_2, y_2), \ldots, (x_n, y_n)\}$. This can be accomplished using the following pseudo-code:

```
Procedure ComputeVoronoi
Require: Points {(x₁, y₁), (x₂, y₂), . . . , (xₙ, yₙ)}
    1:      C_voronoi ← ∅
    2:      for each i ∈ [1, n] do
    3:          C_voronoi ← V[f_(xᵢ, yᵢ)](C_voronoi)
    4:      end for
    5:      return C_voronoi
```

Here, $f_{(x_p, y_p)}: \mathbb{R}^2 \times S^3 \to S^3$ is defined as follows:

$$f_{(x_p, y_p)}(x, y, s)[0] = \emptyset$$

$$f_{(x_p, y_p)}(x, y, s)[1] = \emptyset$$

$$f_{(x_p, y_p)}(x, y, s)[2] = \begin{cases} (i, d_2, 0) & \text{if } s = \emptyset \\ (s[2][0], s[2][1], 0) & s[2][1] < d_2 \\ (i, d_2, 0) & \text{otherwise} \end{cases}$$

where $d_2$ is the Euclidean distance between the point $(x, y)$ and the parameter point $(x_p, y_p)$. The above procedure incrementally builds the Voronoi diagram by adding one input point at a time. That is, during iteration i, the regions of existing polygons closest to point i are merged to form a new Voronoi region corresponding to this point.

In general, if a particular computational geometry query is frequently used, then it could either be implemented as a stored procedure as shown above (if possible), or could be added a new operator itself.

Note if it is not possible to express all computational geometry queries as stored procedures using the previously defined operators, new operators can be added for such queries.

§ 4.1.2.4.6 Complex Queries

The foregoing description focuses on standard queries and showed how they could be translated into expressions. As mentioned in above, expressions are useful only if the operators can be easily composed to also support more complex queries. This section demonstrates this property using a spatial query involving constraints on two spatial attributes (See, e.g., the document: N. Ferreira, J. Poco, H. T. Vo, J. Freire, and C. T. Silva, "Visual Exploration of Big Spatio-Temporal Urban Data: A Study of New York City Taxi Trips," *IEEE TVCG*, 19(12):2149-2158 (2013) (Incorporated herein by reference).): consider selection queries over origin-destination data sets (e.g., taxi trips, migration data), where the selection is based on polygonal constraints on both origin as well as destination locations:

SELECT * FROM $D_P$
WHERE Origin INSIDE $Q_1$ and Destination INSIDE $Q_2$

Here, $D_P$ is the input point data set having two location attributes Origin and Destination, and $Q_1$ and $Q_2$ are polygonal constraints over the two location attributes respectively. Let $\mathbb{C}_p$ be the canvases corresponding to DP as before, but with respect to the origin location. Let $C_{Q1}$ and $C_{Q2}$ be canvases corresponding to the query constraints defined as follows:

$$C_{Qi}(x, y)[0] = \emptyset$$

$$C_{Qi}(x, y)[1] = \emptyset$$

-continued $$C_{Qi}(x, y)[2] = \begin{cases} (i, 1, 0), & \text{if } (x, y) \text{ falls outside } Q \\ \emptyset & \text{otherwise} \end{cases}$$

The above query can then be realized as follows:

$$\mathbb{C}_{result} \leftarrow \mathcal{M}[M_{P'}](\mathcal{B}[\odot] \mathcal{G}[\gamma_d](\mathbb{C}_{origin}, C_{Q2}))$$

where $$\mathbb{C}_{origin} \leftarrow \mathcal{M}[M_P](\mathcal{B}[\odot](\mathbb{C}_P, C_{Q1}))$$

is the same expression as the selection query used earlier. The function $\gamma_d: S^3 \to \mathbb{R}^2$ is used to transform the point from the origin to the destination location and is defined as:

$$\forall s \in S^3, \gamma_d(s) = \text{destination}(s[0][0]),$$

where destination( ) is a function that takes the id of the point and returns the destination location; and the mask function $M_{p'}$ defined as:

$$M_{P'} = \{s \in S^3 | s[0] \neq \emptyset \text{ and } (s[2][0] = 2)\}$$

The other parameter functions $M_p$ and $\odot$ are defined as before. FIG. 8(a) illustrates the above expression as a plan diagram. That is, FIG. 8(a) illustrates a query plan for a selection query over origin-destination data having a polygonal constraint on both spatial attributes. Intuitively, this plan first computes $\mathbb{C}_{origin}$ (i.e., all records whose origin interest with $Q_1$. It then transforms each record in $\mathbb{C}_{origin}$ to its destination and tests for their intersection with $Q_2$.

§ 4.2 Example Methods

FIG. 9 is a flow diagram of an example method 900 for performing a spatial query. As shown, the example method 900 receives spatial data as a first input (Block 910) and receives a spatial query parameter as a second input (Block 920). The example method 900 then embeds geometry of the first input onto a first set of at least one planar canvas, each of which corresponds to one or more geometric objects (Block 930) and embeds geometry of the second input onto a second set of at least one planar canvas, each of which corresponds to one or more geometric objects (Block 940). Finally, the example method 900 performs any combination of at least one geometric operations (e.g., at least one of (A) a geometric transform operation, (B) a value transform operation, (C) a mask operation, (D) a blend operation and (E) a dissect operation) on the first set of at least one planar canvas and the second set of at least one planar canvas to generate at least one output planar canvas (Block 950) before the example method 900 is left (Node 960).

In at least some example implementations of the example method 900, the geometric operations are combined by composing them one after the other in order to realize the spatial query. For examples, all of the foregoing queries (except Voronoi) are examples of composing operators for the query. In other example implementations of the example method 900, geometric operations are combined using a user-defined function (e.g., the Voronoi operation). In at least some such example implementation, the user-defined function includes at least one of (A) a polygonal selection of points, (B) a polygonal selection of polygons, (C) a selection using rectangular range constraints, (D) a selection using one-sided range constraints, (E) a distance-based selection, (F) a point-polygon join, (G) a polygon-polygon join, (H) a point-point join, (I) an aggregation operation over a select operation, (J) an aggregation operation over a join operation, (K) a nearest neighbor operation, and (L) a Vononoi diagram computation.

In at least some example implementations of example method 900, each of the geometric objects is a combination of one or more of (A) a geometric point (which is different from a point on a canvas), (B) a polyline, or (C) a polygon. Note that an infinite length polyline or half-space may be converted into to a finite polyline or polygon, respectively. This conversion may be accomplished by enforcing a bounding box that covers all the input geometry, and would cover these special cases.

In at least some example implementations of example method 900, the act of embedding a geometric object of the first input onto a first planar canvas includes (1) defining a first set of canvas points on the first planar canvas where its corresponding geometric object intersects, and (2) associating each of the canvas points of the first set with an identifier and at least one attribute value, and the act of embedding a geometric object of the second input onto a second planar canvas includes (1) defining a second set of canvas points on the second planar canvas where its corresponding geometric object intersects, and (2) associating each of the canvas points of the second set with an identifier and at least one attribute value. In at least some of these example implementations, each of the canvas points of the first set and the second set is associated with a matrix including one of a geometric point, polyline, or polygon identifier, and one or more attribute values on which a search may be performed. In at least some of these example implementations, each of the canvas points of the first set and the second set is associated with an array including one of a geometric point, polyline, or polygon identifier, and one or more attribute values on which a search may be performed. In at least some of these example implementations, a first row of the matrix corresponds to any geometric points of the corresponding geometric object, a second row of the matrix corresponds to any polylines of the corresponding geometric object, and a third row of the matrix corresponds to any polygons of the corresponding geometric object.

Note that an "attribute value" associated with a canvas point (defined by the intersection of a geometric object and its canvas) is something that may be used to filter, sort, and/or aggregate a query. For example, an attribute value might be a cuisine type, a restaurant name, a relative expense of a meal, whether or not alcohol is served, taxi size, taxi trip fare, taxi trip duration, etc. For example, a taxi trip fare could be used to filter query results (e.g., select only trips with fare of at least $20), or to compute an average (e.g., the average cost of a taxi trip).

In at least some example implementations of the example method 900, each of the geometric transform, value transform, mask, blend and dissect operations are inherently parallelizable.

In at least some example implementations of the example method 900, the act of performing any combination of at least one of (A) a geometric transform operation, (B) a value transform operation, (C) a mask operation, (D) a blend operation and (E) a dissect operation, on the first planar canvas and the second planar canvas to generate one or more output planar canvas includes performing a multiway blend which includes at least two blend operations performed in order.

In at least some example implementations of the example method 900, the act of performing any combination of at least one of (A) a geometric transform operation, (B) a value transform operation, (C) a mask operation, (D) a blend operation and (E) a dissect operation, on the first planar canvas and the second planar canvas to generate one or more output planar canvas includes performing a map operation which includes a dissect operation followed by a geometric transform operation.

In at least some example implementations of the example method 900, the act of performing any combination of at least one of (A) a geometric transform operation, (B) a value transform operation, (C) a mask operation, (D) a blend operation and (E) a dissect operation, on the first planar canvas and the second planar canvas to generate one or more output planar canvas performs, in effect, at least one of (A) a polygonal selection of points, (B) a polygonal selection of polygons, (C) a selection using rectangular range constraints, (D) a selection using one-sided range constraints, (E) a distance-based selection, (F) a point-polygon join, (G) a polygon-polygon join, (H) a point-point join, (I) an aggregation operation over a select operation, (J) an aggregation operation over a join operation, (K) a nearest neighbor operation, and (L) a Vononoi diagram computation.

FIG. 10 is a flow diagram of an example method 1000 for performing a spatial query. This method 1000 is similar to the method 900 of FIG. 9, but it is assumed that spatial data being queried has already been converted (e.g., via preprocessing) into a canvas(es). As shown, the example method 1000 receives, as a first input, a first set of at least one planar canvas embedding geometry of spatial data (Block 1010) and receives a spatial query parameter as a second input (Block 1020). The spatial query parameter is a set of one or more geometric objects, and each of the geometric objects is a combination of one or more of (A) a geometric point, (B) a polyline, or (C) a polygon. The example method 1000 then embeds geometries of the second input onto a second set of at least one planar canvas. (Block 1030) Finally, the example method 1000 performs any combination of at least one operation on the first set of at least one planar canvas and the second set of at least one planar canvas to generate one or more output planar canvases (Block 1040) before the example method 1000 is left (Node 1050).

In some example implementations of the example method 1000, the act of embedding geometry of the second input onto a second planar canvas includes (1) defining a set of canvas points on the second planar canvas where its corresponding geometric object intersects, and (2) associating each of the canvas points of the set with an identifier and at least one attribute value.

FIG. 11 is a flow diagram of an example method 1100 for converting spatial data having a corresponding geometric object into a planar canvas. As shown, the example method 1100 receives as input, the spatial data. (Block 1110) The example method 1100 then embeds geometry of the spatial data onto the planar canvas by (1) defining a set of canvas points on the planar canvas where the geometric object intersects, and (2) associating each of the canvas points of the set with an identifier and at least one attribute value (Block 1120) before the example method 1100 is left (Node 1130).

§ 4.3 Example Apparatus

FIG. 12 is a block diagram of an example machine 1200 that may perform one or more of the methods (including data conversions, operators, example methods 900, 1000, 1100, etc.) described, and/or store information used and/or generated by such methods. The example machine 1200 includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230. The one or more processors 1210 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1220 and/or may be received from an external source via one or more input interface units 1230. The machine executable instructions may be stored as various software modules, each module performing one or more operations. Functional software modules are examples of components which may be used in the apparatus described.

In some embodiments consistent with the present disclosure, the processors 1210 may be one or more microprocessors and/or ASICs. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, GPUs, etc. Alternatively, or in addition, embodiments consistent with the present disclosure (or components or modules thereof) might be implemented as stored program instructions executed by a processor. Such hardware and/or software might be provided in a server, a rack computer, a laptop computer, desktop computer, a tablet computer, a mobile phone, or any device that has computing capabilities.

§ 4.4 Refinements, Alternatives and Extensions

There are many ways to implement the different components of the proposed geometric data representation and operators. The following discusses some possible approaches and the trade-offs involved. A GPU-based prototype implementation for the selection query is described and advantages with respect to being able to reuse the operators across different types of spatial queries are demonstrated.

Not that many of the approaches (e.g., indexes) described in § 1.2.1 above can be easily applied to supplement the different operators described in this application.

§ 4.4.1 Possible Approaches and Trade Offs

Data representation. Given that the representation for a canvas is analogous to that of an image, approaches used for images can be used to store canvases as well—as a vector image or a rasterized image. The rasterized image approach explicitly realizes the canvas, and thus makes it easier to implement the different operators. On the other hand, the vector image approach is more space efficient.

Operators. All proposed operators can independently work on different regions of a single canvas, thus making the implementation inherently parallelizable. Thus, with parallel computing capabilities becoming commonplace even on commodity desktops and laptops, this ability to parallelize the different operators will greatly help making spatial queries more efficient.

Also, note that most of the proposed operators are also common in the computer graphics pipeline (e.g., geometric transformation, blend, mask, etc.). As shown next, the fact that GPUs are explicitly tuned to efficiently perform such operations makes a strong case for implementing the proposed operators using GPUs.

§ 4.4.2 Prototype

A brief overview of one possible GPU-based implementation, with a focus on the blend and mask operators required to realize the spatial selection queries, is described. This example implementation demonstrates its advantages with respect to enabling the reuse of operators. To further illustrate the expressive power of this model, the spatial aggregation operation proposed in the document: E. Tzirita Zacharatou, H. Doraiswamy, A. Ailamaki, C. T. Silva, and J. Freire, "GPU Rasterization for Real-Time Spatial Aggregation Over Arbitrary Polygons," *PVLDB*, 11(3):352-365 (2017) (Incorporated herein by reference) is examined to show how it translates directly into an algebraic expression. Note that there can be alternate implementations with different design choices that will be apparent to those having ordinary skill in the art.

Assume that traditional representation of point and polygon data sets is used for the original data, that is, they are stored as a set of tuples. For implementing an example prototype consistent with the present description, instead of duplicating the geometric objects in the data by explicitly storing the corresponding canvases, the canvas may be created on the fly when the query is executed. A hybrid raster-based representation is used for this canvas, which consists of a collection of pixels, where each pixel stores the necessary information.

Regarding data representation, recall from § 4.1.1.1 that geometric objects are modeled as a union of smooth manifolds, and a canvas representing these objects are defined as a scalar function over $C^2$. Given such a continuous formal representation, it is therefore important to have a discrete representation to be used in the implementation. One choice is to maintain a canvas as a texture (See, e.g., the document: D. Shreiner, G. Sellers, J. M. Kessenich, and B. M. Licea-Kane, *OpenGL Programming Guide: The Official Guide to Learning OpenGL, Version* 4.3, Addison-Wesley Professional, 8th edition (2013) (Incorporated herein by reference).), which corresponds to a collection of pixels. Here, each pixel stores the object information triple.

The canvas functions are defined as discussed above. However, since a pure raster-based realization discretizes the space, additional data corresponding to geometry boundaries is stored. In the case of points, this additional information corresponds to the actual location of the points. In the case of the query polygon, a flag that is set to true if the pixel is on the boundary of the polygon is stored, and the actual vector representation of the polygon is also maintained together with the canvas. To accurately identify all boundary pixels, the OpenGL extension that enables conservative rasterization may be used. This identifies and draws all pixels that are touched by a triangle (or line), and is different from the default rasterization (in which a pixel is only drawn when the center of the pixel is covered by the primitive). This ensures that the border pixels are kept track of in a conservative fashion, and hence there is no loss in accuracy. Additionally, a simple index is maintained that maps each boundary pixel to the actual vector representation of the polygon.

The above realization of the canvas may be generated on the fly by simply rendering (i.e., drawing) the geometry using the traditional graphics pipeline, where the color components (r,g,b,a) are used to store the canvas function. This rendering is performed onto an off-screen buffer, which generates a texture (See, e.g., the document: D. Shreiner, G. Sellers, J. M. Kessenich, and B. M. Licea-Kane, *OpenGL Programming Guide: The Official Guide to Learning OpenGL, Version* 4.3, Addison-Wesley Professional, 8th edition, 2013. (Incorporated herein by reference).) storing the canvas and is used by the operators. To handle polygons with holes, the outer polygon may be first drawn onto the texture. The inner polygon (representing one or more holes) may then be drawn such that the pixels corresponding to it are negated (i.e., the canvas function is set to null).

While the above implementation reduces the number of point-polygon intersection tests, it does not eliminate it completely. Note that each intersection test takes time proportional to the size of the polygonal constraint. The number of such tests depends on the number of points that fall in the boundary of a polygon, and can still slow down the query. Using specialized indexes catered towards the above canvas representation can help in such scenarios. For example, while rendering the polygon to create a canvas, the polygon is first triangulated into a collection of triangles that together form the polygon, and each of these triangles are rendered. Now consider an index which maps a boundary edge of a polygon to the unique triangle that shares this edge. Using this index, the accurate test required for the mask operator can be performed as follows: when a point falls on a boundary pixel, to determine if the point intersects the corresponding polygon, it is sufficient to test whether the point intersects the triangle that shares this boundary edge. This reduces the time complexity of the intersection test from being linear in the size of the polygon to constant time, thus further boosting the performance.

Alternatively, if an approximate result suffices, then the hybrid representation of the canvas can be entirely eliminated, making the implementation not only simpler but significantly more efficient. In such a case, each polygon is represented by the pixels rendered through conservative rasterization. When using this approach, the query results can have false positives, but will not have false negatives. Furthermore, the texture resolution can be adjusted to appropriately bound the approximation error similar to the approach used in the document, L. Wang, R. Christensen, F. Li, and K. Yi, "Spatial Online Sampling and Aggregation," *PVLDB*, 9(3):84-95 (2015) (Incorporated herein by reference).

Another possibility for the implementation is to represent geometric objects as a collection of simplicial complexes, thus avoiding any rasterization. The operators then can be implemented to make use of the native ray tracing support provided by the latest RTX-based Nvidia GPUs. The present inventors decided to use the rasterization pipeline instead so that an example prototype consistent with the present description could support any modern GPU from multiple vendors, and not just the RTX GPUs from Nvidia.

The blend operator can be accomplished through a straightforward alpha blending (See, e.g., the document: D. Shreiner, G. Sellers, J. M. Kessenich, and B. M. Licea-Kane, *OpenGL Programming Guide: The Official Guide to Learning OpenGL, Version* 4.3, Addison-Wesley Professional, 8th edition (2013) (Incorporated herein by reference).) of two textures, which is supported as part of the graphics pipeline. The mask operator looks up each pixel of the texture in parallel and tests for the mask condition. Note that here, the boundary information is used to perform an accurate test if the point is part of a pixel that is on the boundary of the polygon.

A polygonal selection of points may be accomplished by first creating the canvases corresponding to the query polygon and query points, which are blended together and then filtered using the mask operator. The operator functions are as defined previously. This example implementation, without any modification, also works for polygonal selection of polygons, i.e., if the input is changed from a set of points to a set of polygons.

A straightforward variation of the selection query is to support multiple polygons as part of the constraint. In particular, consider the case when the constraint requires the input point to be inside at least one of the polygons (a disjunction). One conventional way of accomplishing this is to test the points with respect to each of the polygonal constraints. However, using an implementation consistent with the present description, this query can be expressed as follows using just the blend and mask operators (also see FIG. 8(b)):

$$\mathbb{C}_{result} \leftarrow \mathcal{M}_{[M_{P'}]}(\mathcal{B}_{[\odot]}(\mathbb{C}_P, \mathcal{B}_{*[\oplus]}(\mathbb{C}_Q)))$$

Here, $\mathbb{C}_Q$ is the collection of canvases corresponding to the query polygons, while the blend functions $\odot$ and $\oplus$ are defined the same as above. The foregoing expression first blends together all the query constraint polygons into a single canvas, which is then used to perform the select similar to the single polygon case. The mask function $M_{p'}$ is defined as:

$$M_{P'} = \{s \in S^3 | s[0] \neq \emptyset \text{ and } (s[2][0] \geq 1).$$

Note that, this mask function $M_{p'}$ is valid even when there is only a single query polygon. So, this example implementation uses $M_{p'}$ instead of the $M_p$ defined earlier. More specifically, recall that the mask function $M_p$ used for the single query polygon case tests the incidence of the polygon on a pixel by testing the id field of the function value corresponding to 2-primitives. Instead, this is accomplished using $M_{p'}$ by checking if the count of the polygons incident on the pixel is at least one. Thus, this mask function $M_{p'}$ is valid even when there is only a single query polygon. So, this example implementation uses this instead of the $M_p$ defined earlier. FIG. 8(b) shows the plan for this query. That is, FIG. 8(b) illustrates a selection query with multiple polygonal constraints. Furthermore, as discussed in § 4.5 below, using the proposed operators also helps improve the performance of the queries when compared to the traditional approach.

A query with a conjunction can also expressed similarly, by appropriately adjusting the mask function.

Regarding a polygonal selection of polygons, note that the example implementation, without any modification, also works if the input is changed from a set of points to a set of polygons.

§ 4.4.3 Spatial Aggregation

Consider the spatial join-aggregation query discussed in § 4.1.2.4.3. Recall that this query was realized by conventional systems using a plan that first performed a join followed by an aggregation. Note that this is the typical approach used by existing approaches (i.e., using a spatial join first).

Raster Join (See, e.g., the document: E. Tzirita Zacharatou, H. Doraiswamy, A. Ailamaki, C. T. Silva, and J. Freire, "GPU Rasterization for Real-Time Spatial Aggregation Over Arbitrary Polygons," PVLDB, 11(3):352-365 (2017) (Incorporated herein by reference).) proposed an alternate approach which maps these queries into operations supported by the graphics pipeline in GPUs, leading to orders of magnitude speedup over CPU-based approaches. This approach can be directly mapped into a query execution plan using the proposed spatial operators as illustrated in FIG. 8(c), and translates to the following expression:

$$\mathcal{C}_{count} \leftarrow \mathcal{B}*_{[+]}(\mathcal{D}*_{[\gamma_c]}(\mathcal{M}_{[M_P]}(\mathcal{B}_{[\odot]}(\mathcal{B}*_{[+]}(\mathcal{C}_P, \mathcal{C}_Y))))).$$

FIG. 8(c) illustrates a spatial aggregation approach used in the document: E. Tzirita Zacharatou, H. Doraiswamy, A. Ailamaki, C. T. Silva, and J. Freire, "GPU Rasterization for Real-Time Spatial Aggregation Over Arbitrary Polygons," PVLDB, 11(3):352-365 (2017) (Incorporated herein by reference).). Here, the different parameters $+$, $\gamma_c$, $M_p$, and $\odot$ are the same as defined earlier. Note that in this plan, all the points are first merged into a single canvas keeping track of partial aggregates. This is then joined with the set of input of polygons, and the results are again merged to compute the final aggregate. Even though this approach performs an additional merge (through the multiway blend), the size of the input for the join is drastically reduced (there is only one canvas on the left hand side of the blend), thus reducing the cost of the entire plan.

§ 4.4.4 Interoperability with Relational Model

The proposed model is compatible with the relational model and can be incorporated into existing relational systems. In particular, the object information set S can be defined appropriately to suit this purpose.

Recall that the minimalistic definition of S used in this application reserves the first element of the triple to store the unique ID corresponding to the data record. Thus, given a set of canvases corresponding to existing data sets, it is possible to switch to the corresponding relational tuple using this ID. Analogously, the storage structure of a relational tuple has to be changed to link to the corresponding canvas, thus allowing connection in the opposite direction. Alternatively, similar to the example proof-of-concept implementation, the canvases could also be created on demand.

On the other extreme, the set S can explicitly store the entire relational tuple, making the tabular data and the corresponding canvas tightly coupled. Thus, conceptually, one can consider the relational tuple and a canvas to be the dual of each other allowing a seamless use of the two representations by a query optimizer to appropriately generate query plans involving both spatial and non-spatial operators.

§ 4.4.5 Query Optimization

The proposed representation facilitates query optimization in the following ways.

Allow different query execution plans. Given a complex query Q, the proposed representation enables the creation of multiple plans to realize Q. (Sections 4.4.2 and 4.4.3 provided examples for disjunction queries and for the spatial aggregation query.) For another example, consider the selection query on origin-destination data presented in § 4.1.2.4.6. An alternate plan for this query would be to swap the origin and destination constraints, and the parameter d appropriately. In all such scenarios, by appropriately modeling the cost functions of the operators together with metadata about the input, the optimizer can therefore choose a plan that has a lower cost.

Support diverse implementations. It is also possible to have multiple implementations of the same operators, for example, using prebuilt spatial indexes. Each of these indexes would result in a different cost based on the properties of the data and the query. Moreover, the representation allows for different implementations of the operators based on the available hardware such as GPUs, thus providing a rich set of options over which to perform the optimization.

Enable general query processing. In addition to pure spatial queries such as the ones discussed thus far, it is fairly common in analysis tasks that a query combines both spatial and relational aspects of the data. Given the duality between the canvas and the relational tuple, the proposed operators can also be easily plugged into existing query optimizers, thus allowing for complex queries involving both the spatial and relational attributes.

While the proposed data representation can be directly extended to support 3D primitives, the operators over such 3D data do not have a straightforward implementation using the GPU. Given that native ray tracing support is now being introduced in GPUs, example embodiments consistent with the present description can be extended to use advances to support 3D spatial queries.

§ 4.5 Experimental Evaluation

The performance of the spatial selection queries using the example implementation described above was evaluated. All experiments were run on a laptop having an Intel Core i7-8750H processor, 16 GB memory and 512 GB SSD. The laptop has a dual Nvidia GTX 1070 Max-Q GPU with 8 GB graphics memory, and an integrated Intel UHD Graphics 630 GPU.

§ 4.5.1 Data and Queries

Goals of the evaluation include (1) demonstrating the advantage of using GPU-friendly operators compared with a traditional GPU-based solution, and (2) illustrating how the same operators can be used for variations of a give query. The former is demonstrated by using selection queries that select trips from the New York City's taxi data having their pickup location within a query polygon. The latter is illustrated using queries having a disjunction of multiple polygonal constraints. The size of the input was varied using the pickup time range of the taxi trips.

To mimic real world use cases, all the query polygons used in these queries were "hand-drawn" using a visual interface (See, e.g., the document: N. Ferreira, J. Poco, H. T. Vo, J. Freire, and C. T. Silva, "Visual Exploration of Big Spatio-Temporal Urban Data: A Study of New York City Taxi Trips," *IEEE TVCG*, 19(12):2149-2158 (2013) (Incorporated herein by reference).) and adjusted to have the same bounding box (same MBR). In particular, only taxi trips that have their pickup location within this bounding box (MBR) were used as input. In other words, the evaluation assumes the existence of a filtering stage and primarily focuses on the refinement step. This was done for two reasons. First, the refinement stage, and not filtering, is now the primary bottleneck. Unlike previous decades when the disk-based index filtering was the primary bottleneck, due to the existence of fast SSD-based storage and large CPU memory, the filtering takes only a small fraction of the query time. For example, the filtering step used by the state-of-the-art GPU-based selection approach, even though it is CPU-based, takes only a few milliseconds even for data having over a billion points (See, e.g., the document: H. Doraiswamy, H. T. Vo, C. T. Silva, and J. Freire, "A GPU-Based Index to Support Interactive Spatio-Temporal Queries Over Historical Data," *Proc. ICDE*, pages 1086-1097 (IEEE, May 2016) (Incorporated herein by reference).) Second, when working with complex queries, depending on the query parameters, the optimizer need not always choose to use the spatial index corresponding to a spatial parameter, and the spatial operations could be further up in the plan (e.g., the optimizer might to choose first filter based on another attribute, say time, before performing a spatial operation). In such scenarios, the spatial operation would not have the benefit of an index based filtering, and query bottleneck would then be the refinement step. Additionally, the above setup also helps remove input bias when comparing the performance across polygonal constraints having different shapes and sizes.

This ensures a fair comparison with existing approaches by negating the influence of any index schemes used by them. Thus, the existing approaches now simply boil down to performing a point-in-polygon test on all the input points (since any index would have been used only to filter points outside the query polygon's bounding box). The size of the input is varied using the pickup time range of the taxi trips.

In addition, the approaches over disjunction queries having multiple polygonal constraints were evaluated.

§ 4.5.2 Approaches

The example implementation was implemented using C++ and OpenGL, thus allowing it to run on any GPU that supports OpenGL 4.5. The performance of the example implementation described above was compared with a CPU baseline, a parallel CPU implementation using OpenMP, as well as a GPU baseline. Because of the above mentioned experimental setup that eliminates the effect of indexes used by current state-of-the-art, only the PIP tests for the above baselines need be implemented. While an example prototype consistent with the present description was executed on two different GPUs (denoted as Nvidia and Intel), the GPU baseline was executed only on the faster Nvidia GPU.

§ 4.5.3 Performance

FIGS. 13(*a*) and 13(*c*) show the speedup achieved by the different approaches over a single threaded CPU implementation when the query had one and two polygonal constraints, respectively. Note that while all GPU-based approaches are over two orders of magnitude faster than the CPU-based approach, the speedup of the example implementation increases when the polygonal constraint increases. This is because the only additional work done by the example implementation when more polygons are involved is to blend the constraint polygons. This is significantly less work when compared to existing approaches which have to perform more PIP tests in this case. This is corroborated when looking at the query run times in FIGS. 13(*b*) and 13(*d*) (split up between memory transfer time and processing time) wherein an approach consistent with the present description (in red) requires only 4 seconds (using the Nvidia GPU) even when there are two polygons as constraints on an input as large as 571M points.

FIG. 14 shows the speedup and running times when the polygonal constraint is varied. Here, the different polygons had different shapes (and sizes) with query selectivity varying from roughly 3% to 83%. While there is some variation in the processing time depending on the complexity of the polygon constraint, note that this variation is higher in case of the baseline. This is because the number of PIP tests performed by the baseline is linearly proportional to the size of the polygon. Irrespective of this complexity, example prototype consistent with the present description using the discrete GPU requires at most 2 seconds for an input of size 302M points. For a given input and GPU, not only is the time to transfer data between the CPU and GPU similar, but is also a significant fraction of the query time. In this light, the speedup in the processing time achieved using an example prototype consistent with the present description over a traditional GPU-based approach (which is greater than the overall speedup depicted in FIGS. 13(*a*) and 13(*c*)) clearly demonstrates the advantages of using a GPU-friendly approach.

Also, interesting to note is the performance of the example implementation on the integrated Intel GPU. While, as expected, it is slower than the GPU baseline using a Nvidia GPU, it is still over two-orders of magnitude faster than the CPU implementation. Given that these GPUs are present in even mid-range laptops, ultrabooks, and even tablets, example implementations consistent with the present description can potentially allow fast spatial queries even on such systems.

The present disclosure describes a new data representation and operations to support queries over spatial data sets. A key and novel idea introduced in this disclosure is to use a representation that captures the geometric properties inherent in spatial data, and design operators that can be applied directly on this geometry. The proposed operations are expressive and can realize common spatial queries. In addition, since the expressions of operations are closed, they can also be used to construct complex queries by composing the operators. The ability to map the proposed operators to computer graphics functions has the potential to simplify the adoption of advances in GPU architecture and allow efficient spatial queries, and thus spatial analyses, even on commodity hardware.

Example embodiments consistent with the present description can also be easily incorporated into existing systems without being exposed to the user while at the same time providing significant benefits to the database engine. In other words, example embodiments consistent with the present description can be developer-facing and help a database developer more easily implement efficient spatial operators and spatial query engines.

Example embodiments consistent with the present description not only provide a uniform approach that is expressive and able to represent a wide range of spatial queries, but also make new implementations (e.g., to leverage different hardware) easy by requiring only a small set of basic operations to be implemented.

Example embodiments consistent with the present description were designed keeping GPUs in mind, and are based on computer graphics operations for which they are optimized. That is, the geometric operators described are inherently parallelizable and very similar to, and in many cases the same as, commonly used computer graphics operations. Since GPUs were designed and optimized specifically for such operations, efficient GPU-based implementations for the operators are now possible. Thus, the operators described can map directly to GPU, which allows the hardware to be leveraged, and performance to be improved compared to existing GPU methods.

What is claimed is:

1. A computer-implemented method for performing a spatial query, the computer-implemented method comprising:
   a) receiving spatial data as a first input;
   b) receiving a spatial query parameter as a second input;
   c) embedding geometry of the first input onto a first set of at least one planar canvas, each of which corresponds to one or more geometric objects, wherein the act of embedding a geometric object of the first input onto a first planar canvas includes (1) defining a first set of canvas points on the first planar canvas where its corresponding geometric object intersects, and (2) associating each of the canvas points of the first set with an identifier and at least one attribute value;
   d) embedding geometry of the second input onto a second set of at least one planar canvas, each of which corresponds to one or more geometric objects; and
   e) performing, using at least one graphics processing unit (GPU), any combination of at least one geometric operations, on the first set of at least one planar canvas and the second set of at least one planar canvas to generate at least one output planar canvas,
   wherein the act of embedding a geometric object of the second input onto a second planar canvas includes (1) defining a second set of canvas points on the second planar canvas where its corresponding geometric object intersects, and (2) associating each of the canvas points of the second set with an identifier and at least one attribute value,
   wherein each of the canvas points of the first set and the second set is associated with a matrix or array including one of a geometric point, polyline, or polygon identifier, and one or more attribute values used by the at least one geometric operation.

2. The computer-implemented method of claim 1 wherein at least one geometric operation includes at least one of (A) a geometric transform operation, (B) a value transform operation, (C) a mask operation, (D) a blend operation and (E) a dissect operation.

3. The computer-implemented method of claim 2, wherein each of the geometric transform, value transform, mask, blend and dissect operations are inherently parallelizable.

4. The computer-implemented method of claim 2 wherein the act of performing any combination of at least one of (A) a geometric transform operation, (B) a value transform operation, (C) a mask operation, (D) a blend operation and (E) a dissect operation, on the first planar canvas and the second planar canvas to generate one or more output planar canvas includes performing a multiway blend which includes at least two blend operations performed in order.

5. The computer-implemented method of claim 2 wherein the act of performing any combination of at least one of (A) a geometric transform operation, (B) a value transform operation, (C) a mask operation, (D) a blend operation and (E) a dissect operation, on the first planar canvas and the second planar canvas to generate one or more output planar canvas includes performing a map operation which includes a dissect operation followed by a geometric transform operation.

6. The computer-implemented method of claim 2 wherein the act of performing any combination of at least one of (A) a geometric transform operation, (B) a value transform operation, (C) a mask operation, (D) a blend operation and (E) a dissect operation, on the first planar canvas and the second planar canvas to generate one or more output planar canvas performs, in effect, at least one of (A) a polygonal selection of points, (B) a polygonal selection of polygons, (C) a selection using rectangular range constraints, (D) a selection using one-sided range constraints, (E) a distance-based selection, (F) a point-polygon join, (G) a polygon-polygon join, (H) a point-point join, (I) an aggregation operation over a select operation, (J) an aggregation operation over a join operation, (K) a nearest neighbor operation, (L) a Vononoi diagram computation, (M) a polygonal selection of polylines, (N) a point-point join, (O) a polygon-polyline join, (P) a polyline-polyline join, and (Q) a polyline-point join.

7. The computer-implemented method of claim 1 wherein the geometric operations are combined by composing them one after the other in order to realize the spatial query.

8. The computer-implemented method of claim 1 wherein the geometric operations are combined using a user-defined function.

9. The computer-implemented method of claim 8 wherein the user-defined function includes at least one of (A) a polygonal selection of points, (B) a polygonal selection of polygons, (C) a selection using rectangular range constraints, (D) a selection using one-sided range constraints, (E) a distance-based selection, (F) a point-polygon join, (G) a polygon-polygon join, (H) a point-point join, (I) an aggregation operation over a select operation, (J) an aggregation operation over a join operation, (K) a nearest neighbor operation, (L) a Vononoi diagram computation, (M) a polygonal selection of polylines, (N) a point-point join, (O) a polygon-polyline join, (P) a polyline-polyline join, and (Q) a polyline-point join.

10. The computer-implemented method of claim 1, wherein each of the geometric objects is a combination of one or more of (A) a geometric point, (B) a polyline, or (C) a polygon.

11. The computer implemented method of claim 1 wherein each of the canvas points of the first set and the second set is associated with a matrix including one of a geometric point, polyline, or polygon identifier, and one or more attribute values used by the at least one geometric operation.

12. The computer-implemented method of claim 11 wherein each matrix has a plurality of rows, a first one of the plurality of rows of the matrix corresponds to any geometric points of the corresponding geometric object, a second one of the rows of the matrix corresponds to any polylines of the corresponding geometric object, and a third one of the plurality of rows of the matrix corresponds to any polygons of the corresponding geometric object.

13. The computer-implemented method of claim 1 wherein each of the canvas points of the first set and the second set is associated with an array including one of a geometric point, polyline, or polygon identifier, and one or more attribute values used by the at least one geometric operation.

14. Apparatus comprising:
a) at least one graphics processing unit (GPU); and
b) a non-transitory computer readable medium storing instructions which, when executed by the at least one GPU, cause the at least one GPU to perform a method for performing a spatial query, the method including
1) Receiving spatial data as a first input,
2) Receiving a spatial query parameter as a second input,
3) embedding geometry of the first input onto a first set of at least one planar canvas, each of which corresponds to one or more geometric objects, wherein the act of embedding a geometric object of the first input onto a first planar canvas includes (1) defining a first set of canvas points on the first planar canvas where its corresponding geometric object intersects, and (2) associating each of the canvas points of the first set with an identifier and at least one attribute value,
4) Embedding geometry of the second input onto a second set of at least one planar canvas, each of which corresponds to one or more geometric objects, wherein the act of embedding a geometric object of the second input onto a second planar canvas includes (1) defining a second set of canvas points on the second planar canvas where its corresponding geometric object intersects, and (2) associating each of the canvas points of the second set with an identifier and at least one attribute value, and
5) Performing any combination of at least one geometric operations, on the first set of at least one planar canvas and the second set of at least one planar canvas to generate at least one output planar canvas,
wherein each of the canvas points of the first set and the second set is associated with a matrix or array including one of a geometric point, polyline, or polygon identifier, and one or more attribute values used by the at least one geometric operations.

15. Apparatus comprising:
a) at least one graphics processing unit (GPU); and
b) a non-transitory computer readable medium storing instructions which, when executed by the at least one GPU, cause the at least one GPU to perform a method for performing a spatial query, the method including:
1) Receiving as a first input, a first set of at least one planar canvas embedding geometry of spatial data, wherein each of the at least one planar canvas of the first set includes a set of canvas points on the planar canvas where its corresponding geometric object intersects, each of which canvas points being associated with both (i) an identifier and (ii) a matrix or array including one of a geometric point, polyline, or polygon identifier, and one or more attribute values,
2) Receiving a spatial query parameter as a second input,
3) Embedding geometries of the second input onto a second set of at least one planar canvas, wherein the act of embedding a geometric object of the second input onto a second planar canvas includes (1) defining a second set of canvas points on the second planar canvas where its corresponding geometric object intersects, and (2) associating each of the canvas points of the second set with an identifier and at least one attribute value, and
4) Performing any combination of at least one operation on the first set of at least one planar canvas and the second set of at least one planar canvas to generate one or more output planar canvases,
wherein the spatial query parameter is a set of one or more geometric objects, and each of the geometric objects is a combination of one or more of (A) a geometric point, (B) a polyline, or (C) a polygon, and
wherein each of the canvas points of the second set is associated with a matrix or array including one of a geometric point, polyline, or polygon identifier, and one or more attribute values used by the at least one operation.

16. Apparatus comprising:
a) at least one graphics processing unit (GPU); and
b) a non-transitory computer readable medium storing instructions which, when executed by the at least one GPU, cause the at least one GPU to perform a GPU implemented method for converting first spatial data having a corresponding first geometric object into a first planar canvas and converting second spatial data having a corresponding second geometric object into a second planar canvas, the GPU implemented method including
1) Receiving as input, the first and second spatial data, and
2) Embedding geometry of the first spatial data onto the first planar canvas by (1) defining a first set of canvas points on the first planar canvas where the geometric object intersects, and (2) associating each of the canvas points of the first set with an identifier and at least one attribute value, wherein the act of embedding a geometric object of the input onto the first planar canvas includes (1) defining the first set of canvas points on the first planar canvas where its corresponding geometric object intersects, and (2) associating each of the canvas points of the first set with an identifier and at least one attribute value, wherein the act of embedding the second geometric object of the input onto the second planar canvas includes (1) defining a second set of canvas points on the second planar canvas where its corresponding geometric object intersects, and (2) associating each of the canvas points of the second set with an identifier and at least one attribute value, and wherein each of the canvas points of the first set and the second set is associated with a matrix or array including one of a geometric point, polyline, or polygon identifier, and one or more attribute values used by the at least one geometric operation.

17. The apparatus of claim 16, wherein each matrix has a plurality of rows, a first one of the plurality of rows of the matrix corresponds to any geometric points of the corresponding geometric object, a second one of the rows of the matrix corresponds to any polylines of the corresponding geometric object, and a third one of the plurality of rows of the matrix corresponds to any polygons of the corresponding geometric object.

* * * * *